United States Patent [19]

Nelson

[11] Patent Number: 4,651,158
[45] Date of Patent: Mar. 17, 1987

[54] DME MORSE CODE IDENTITY DECODER

[75] Inventor: David A. Nelson, Cedar Rapids, Iowa

[73] Assignee: Rockwell International Corporation, El Segundo, Calif.

[21] Appl. No.: 537,880

[22] Filed: Sep. 30, 1983

[51] Int. Cl.⁴ .............................................. G01S 13/80
[52] U.S. Cl. ......................................................... 342/45
[58] Field of Search ............... 343/6.5 R, 6.5 LC, 7.3, 343/399, 401, 402, 463

[56] References Cited

U.S. PATENT DOCUMENTS

| | | | |
|---|---|---|---|
| 3,801,979 | 4/1974 | Chisholm ........................ | 343/399 X |
| 3,821,523 | 6/1974 | Chisholm et al. ............... | 343/399 X |
| 3,975,731 | 8/1976 | Latham et al. ................. | 343/7.3 |
| 4,032,756 | 6/1977 | Jezo .............................. | 343/399 X |
| 4,041,486 | 8/1977 | Hussain ......................... | 343/7.3 |

*Primary Examiner*—Thomas H. Tarcza
*Assistant Examiner*—Mark Hellner

*Attorney, Agent, or Firm*—Robert C. Mayes; Howard R. Greenberg; H. Fredrick Hamann

[57] ABSTRACT

A multichannel DME ranging circuit is described which is capable of simultaneous multistation operation. A microprocessor is coupled to control associated peripheral devices and the receiver/transmitter of a DME to produce a multiplexing for receiving frequency data input from up to three DME ground stations. The data received from each of the three DME stations is used to generate timing and interface signals to control the DME receiver/transmitter and associated video processing circuitry. The video processing circuitry is in turn used to provide signals to the ranging circuit to independently determine range, velocity, time-to-station, and the identity of each of the stations providing input to the DME. Each of the three channels is constructed so that it may operate independently of the others to produce rapid acquisition, search, track and identification of each of the particular ground stations to be monitored.

13 Claims, 11 Drawing Figures

BUS DETAIL

DATA OUTPUT ROUTINE TO ALL OUTPUTS

2 OUT OF 5 TUNING ROUTINE
(PARALLEL TUNING ROUTINE)

IDENTITY DECODING ROUTINE

SEARCH/TRACK ROUTINE

VIDEO INTERRUPT ROUTINE

DME MORSE CODE IDENTITY DECODER

CROSS-REFERENCE

Cross-reference is made to the commonly-owned U.S. Patent application entitled "Multichannel DME Ranging Circuit", U.S. Ser. No. 537,879, filed on even date herewith.

BACKGROUND OF THE INVENTION

The present invention relates to distance measuring equipment and more particularly to a multichannel distance measuring ranging circuit which allows monitoring of multiple DME ground stations.

Distance measuring equipment (DME) is well known in the art, and has been used extensively in commercial aircraft to provide range and velocity information to aircraft interrogating a ground station. Distance measuring equipment has been used in conjunction with VOR equipment to fix the position of an aircraft with respect to a known ground station in accordance with well-known principles. More particularly, the VOR equipment is used to determine the bearing of an aircraft with respect to a given ground station and the DME is used to fix the range of the aircraft from that same ground station. With the bearing and range of the station identified, the location of the aircraft with respect to the ground station can be determined.

While VOR and DME equipment has been used successfully to determine aircraft position, there are inherent inaccuracies produced by VOR equipment which reduces the accuracy of that determination. Modern digital techniques have been implemented in the DME devices, however, which have vastly improved the accuracy of that equipment. Accordingly, since it is known that the same position determination can be made with at least three DME's, it has been suggested that such DME's be used to provide aircraft position determinations rather than one DME and one VOR. It will be appreciated, however, that multiple DME's are expensive and take up aircraft space which might otherwise be used for other instrumentation. Accordingly, the use of a single DME to fix aircraft position is highly desirable in current commercial and private aircraft.

In the prior art, there have been attempts to obviate the need for multiple DME's by multiplexing a single DME to obtain multichannel operation. In particular, U.S. Pat. No. Re. 30,069 issued to Wayne Miller on Aug. 7, 1979, discloses a multiranging DME system which time multiplexes a DME between two channels which allows reception of multiple frequency inputs from two separate ground stations. While this technique expands the application of the DME to more than one ground station, the known technique primarily uses one channel to obtain distance and velocity information and the other channel to obtain distance information. As a result, aircraft position may still be ambiguous and another DME would be required to electronically resolve the ambiguity in aircraft position. In addition, the operation of the channels is not independent and is incapable of providing velocity and identity information for each of the selected ground stations.

Accordingly, the present invention has been developed to overcome the specific shortcomings of the above known techniques and to provide an improved DME ranging system capable of providing multichannel operation to provide accurate aircraft position and velocity determinations.

SUMMARY OF THE INVENTION

In accordance with the present invention, a single DME having transmit/receive circuitry is coupled to a microprocessor and appropriate peripheral devices to produce a time-multiplexed output enabling the interrogation of three DME ground stations. The interrogation of each of the three stations is electronically controlled such that each of the three channels may be operated independently to interrogate, process and provide output of the information associated with each DME ground station. During each multiplexing period, the transmitter is slewed to transmit at the appropriate ground station frequency to obtain return signals which are used to generate timing and interface signals to control the receiver/transmitter and associated video processing circuitry. The output of that video processing circuitry is used by the ranging circuit under microprocessor control to independently determine the range, velocity, time-to-station, and identity for each of the stations. During the time that one ground station is being interrogated, the data received from a previously interrogated ground station may be processed to produce a calculation of the desired information. Each of the multiplexed stations can alternately be in the same mode of operation, thereby providing the independent operation necessary for efficiently searching, tracking, and providing the outputs required to fix aircraft position with the DME. The system is also operated such that identity information which is transmitted by the ground stations can be detected and decoded to provide appropriate character identification representing the particular ground station. The system is implemented digitally under control of a microprocessor, thereby providing the increased speed and accuracy necessary for obtaining reliable range and velocity information for current high-speed aircraft.

It is therefore a feature of the invention to provide an improved DME ranging circuit for multistation operation.

It is a further feature of the invention to provide a multichannel DME ranging circuit of simplified construction and reduced complexity for providing more accurate aircraft position information.

Still another feature of the invention is to provide a multichannel DME system which is capable of providing multiple channel operation for independently determining range, velocity, time-to-station, and identity, for multiple ground stations.

Another feature of the invention is to provide a multichannel digital DME ranging circuit which is capable of providing improved station interrogation and acquisition for each of three ground stations.

Still another feature of the invention is to provide an improved DME ranging circuit which provides improved speed in searching and tracking the range of multiple ground stations.

Yet another feature of the invention is to provide a multichannel DME system which provides improved detection of station identification signals for Morse code identification decoding substantially simultaneously in an interleaved reception time-multiplexed fashion.

These and other advantages and novel features of the invention will become apparent from the following detailed description when taken in connection with the accompanying drawings wherein:

DETAILED DESCRIPTION OF A PREFERRED EMBODIMENT

As is known in the prior art, a typical DME system includes a transmitter which transmits a pulse pair spaced randomly to a selected ground station having an unknown distance from the aircraft. The pulse pair is received by the ground station and retransmitted to the aircraft following a fixed and known delay. The DME receiver then senses the returns to detect the retransmitted pulse pair and, by subtracting the inserted delay, can determine the transit time of the pulses. Once the transit time has been determined, the distance to the selected ground station can easily be determined with simple mathematical techniques. Normally, the aircraft generates pulse pairs at a repetition rate of 30 pairs per second or less with the spacing being random so that the pulse pair returns of one aircraft can be distinguished from the pulse pairs of other aircraft operating in the vicinity of the same ground stations, and thereby enable the detection of the true pulse pair returns.

While the above-described operation is typical of a single DME interrogating a single ground station, the present invention employs the same general techniques to implement multichannel operation. Accordingly, some of the same elements used in a single channel DME are used with the DME multichannel ranging circuit described herein. More particularly, referring to FIG. 1 wherein like numerals are used to refer to like elements throughout, a multichannel DME ranging circuit is shown coupled to control conventional DME elements in a unique manner to enable multichannel operation as is subsequently described.

Figure 1:
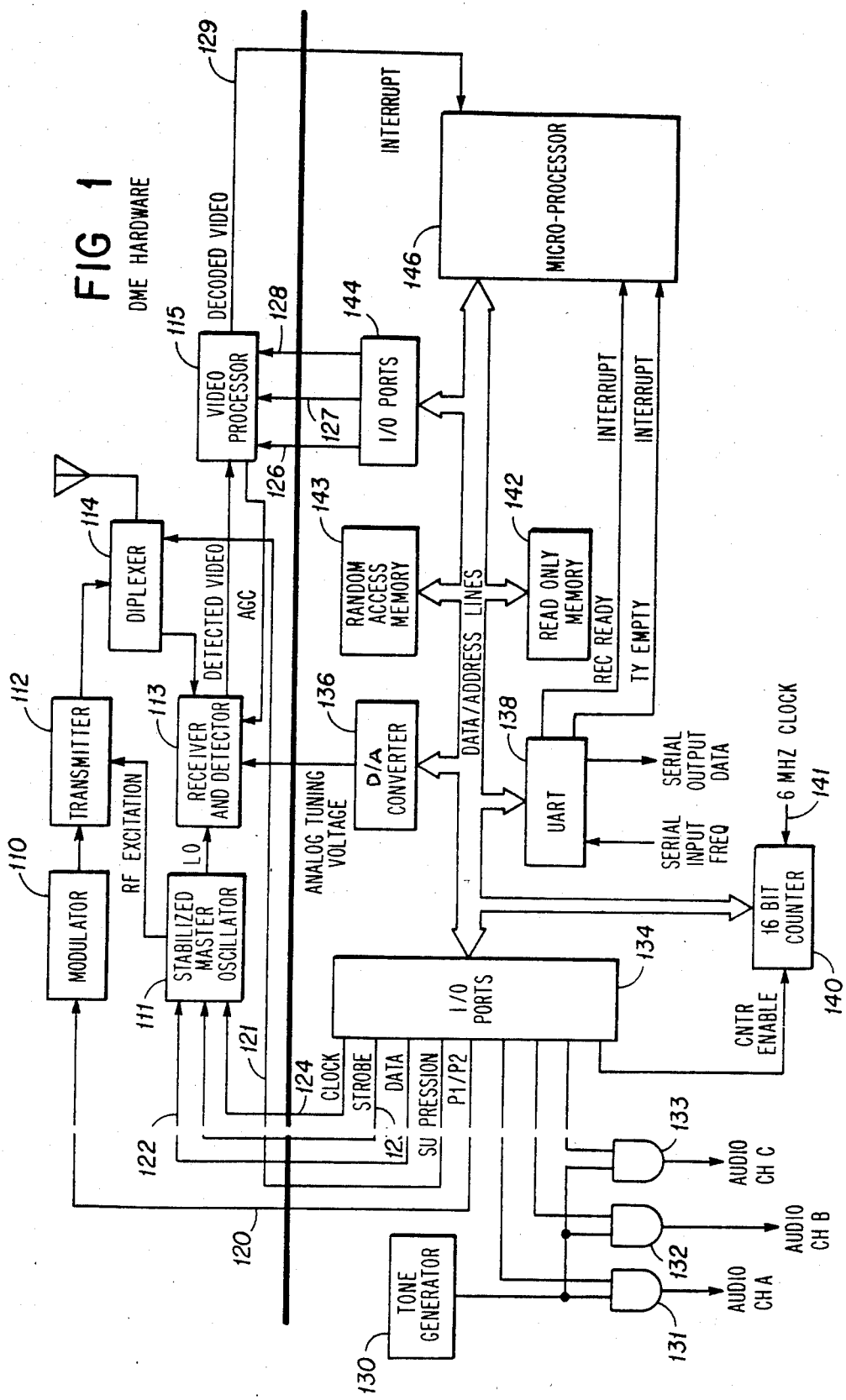
FIG. 1 is a block diagram showing the DME ranging circuit of the present invention for multiple channel operation.

As shown in FIG. 1, the conventional elements of a DME include an antenna coupled to a diplexer 114 which gates input from a transmitter 112 for transmission by the antenna to a ground station. The diplexer 114 also alternately gates returned signals retransmitted by the ground station to receiver detector 113, where the returned signals are processed to provide a detected video signal to a video processor 115. A modulator 110 provides trigger pulses spaced at predetermined intervals to gate the transmitter 112 for providing transmission of the pulse pairs through the antenna to the selected ground station. A stabilized master oscillator (SMO) 111 is coupled to the transmitter 112 to provide the carrier frequency associated with the particular ground station selected for interrogation. The stabilized master oscillator 111 may thus be tuned to different frequencies associated with different ground stations.

During flight, different ground stations may be interrogated, and in the case of the present invention, multiple ground stations may be interrogated simultaneously to obtain the desired range, velocity and identity information. The stabilized master oscillator 111 also provides a local oscillator output to receiver detector 113 to synchronize the receiver detector 113 with the transmitted frequency. Likewise, the receiver detector 113 receives input in the form of an analog voltage from the digital-to-analog converter 136 which is utilized to tune the receiver detector to the frequency of the selected ground station. The above elements are conventional and a further detailed explanation of their construction is unnecessary for an understanding of the present invention. However, the operation of those elements in the manner to be subsequently described in combination with the DME ranging circuit of the present invention, produces a multichannel system which provides the benefit of multiple independent channel processing of a plurality of DME ground stations with a single DME.

Referring still to FIG. 1, the DME ranging circuit of the present invention basically includes the primary components of a microprocessor 146, a random access memory 143, a read only memory 142, a digital-to-analog converter 136, and a universal asynchronous receiver/transmitter (UART) 138. The ranging circuit also includes input/output (I/O) ports 134 and 144, respectively, a counter 140, a tone generator 130, and the appropriate bus or data/address lines as are necessary for communication between each of the peripheral devices and the microprocessor 146. Generally, in order to set the frequencies of the multiple DME ground stations to be interrogated, serial input frequency data is provided from an external source such as a push-button panel or other input device as an asynchronous serial data stream to the UART 138. This serial data is translated into byte length characters by the UART 138 and the frequency of each selected station is stored in a designated memory location in RAM 143. All serial data which is continuously received by the UART 138 is transferred to the microprocessor 146 via interrupt lines. Likewise, control of the receiver/transmitter is exercised via a serial data transfer through I/O port 134 over lines 120-122 (and strobe and clock pulses from 123 and 124, respectively) to the SMO 111 where the representation of the particularly selected frequency causes the master oscillator 111 to provide an output frequency equal to that frequency represented by the data selected from RAM 143. Also, the same data is provided via the D/A converter 136 to tune the receiver detector 113 and gate the modulator 110 (over line 120) trigger pulses to key the transmitter 112. All of this is performed for multichannel operation under the control of appropriate software through microprocessor 146.

Generally, the software causes a given sequence of events to be performed. Specifically, the serial input data word representing the frequency of a first channel (A) is provided as a data output from random access memory 143 over data line 122 to the SMO 111. At the same time, the microprocessor 146 causes the D/A converter 136 to be loaded with a digital word corresponding to the voltage necessary to tune the receiver detector 113 to the channel A frequency represented by the value stored for that frequency in RAM 143. After an appropriate delay (typically 4 ms) to allow the SMO 111 to be slewed to the appropriate frequency, the modulator 110 through I/O port 134, is gated over line 120 with trigger pulses spaced either 12 or 36 μS apart to key the DME transmitter. It should be understood, that while reference herein will be made to a pulse or pulses, such terminology refers to the gating of pulse pairs as is typically used in a DME. Accordingly, all reference to pulse will include and should be construed to include pulse pairs which are randomly spaced to allow detection of the signals for a particular aircraft as was previously described.

In the particular embodiment, during the time that the SMO 111 is slewing to the selected frequency of one channel, the results of the interrogation of another channel (previously interrogated) may be processed by the microprocessor 146. After the lapse of the delay and the gating of the modulator 110, the transmitter 112 transmits the appropriate pulses to the ground station at the selected frequency, causing the generation of return or reply signals from the ground station, which are received by the antenna and through diplexer 114 by receiver detector 113. These replies are processed by the video processor 115 and made available to the DME ranging circuit for a predetermined time period (typically 6 ms) over line 129. During the time that the transmitter 112 is transmitting the selected frequency, the microprocessor 146 causes an output on line 121 to diplexer 114 which may be used to suppress other pulse equipments on board the aircraft to prevent receipt of extraneous pulses by receiver detector 113 during the operation time of the DME. The above sequence of operations for channel A is repeated for each of two other channels, B and C, under the control of the microprocessor 146 to produce the multiplexing of three channels to obtain the DME ranging velocity and identifing information.

Although the construction and operation of the system will be described in more detail below, a brief description of the operation will enhance an understanding of that detailed construction. Accordingly, the following explanation regarding the particular modes of operation for each channel will be made with reference to one channel only, it being understood that the same operation occurs for each channel. Specifically, following the output of the trigger pulse from modulator 110 in response to the signal on line 120, a 16-bit counter 140 clocked at a 6 MHz rate through input 141 is enabled by microprocessor 146 through I/O port 134. Each time a video reply is received, the counter state is latched and stored in memory. When the counter state equals approximately 6 ms (corresponding to completion of the 6 ms period previously referred to in connection with the video decoder providing replies to the ranging circuit) the latch and store mode is discontinued. Subsequently, after the output of new frequency data to the SMO 111 signifying that the oscillator is being used to interrogate another ground station, processing of the stored data begins. The data stored in the above sequence is used to determine the presence of identity replies as will be detailed below and to provide ranging and relative velocity with respect to the DME ground station. Identity spacing is detected by sequentially subtracting from the counter value associated with each reply the value associated with each of the two previous replies. Each of these subtractions which results in a remainder equivalent to 740 or 1480 ms is counted. If the number counted during two sample periods is ten or more, an audio tone from tone generator 130 is gated by AND gate 131, 132 or 133, respectively, to the external audio output for one of the channels A, B or C. The tone will remain enabled until the next two cycles in which less than ten subtractions meet the spacing criteria. The separate audio outputs for each of the channels allows completely independent operation of each channel.

Ranging information is derived by processing the reply information in one of three modes (i.e., search, pretrack and track). In the search mode, a list of replies stored during each of the previous two cycles are compared. If a value from each of the two lists corresponds, this value is stored in the memory location for range and the status of the circuit advances to the pretrack mode. In the pretrack mode, the most recent reply list is compared to the stored range value in memory, and each time a coincidence is detected, a search/track counter is incremented. Alternatively, each time no coincidence is detected, the same counter is decremented. If the counter reaches a lower value, the status of the ranging circuit is reset to search and the previous sequence is repeated. If the counter reaches an upper value, the status is advanced to the track mode. In the track mode, the reply list and the search/track counter are used similarly as in the pretrack mode with the exception that the attainment of the upper counter value is used to reset a ten second timer whose terminal state will reset the status of the ranging circuit to the search mode. The system is operated and controlled by the microprocessor 146 such that range and velocity information are not considered valid unless the ranging circuit is in the track mode.

In the pretrack and track mode, the value of the result of the video list comparison is applied to a digital servo loop to allow updating of the stored range and derivation of the relative velocity. The servo loop is a conventional Type II digital servo loop with four different loop parameter values. These four loop parameters are selected based on the average value of the distance error (as computed during the compare cycle) to permit the velocity output to have a time constant varying between 5 and 45 seconds. This permits rapid build-up of indicated velocity following the station acquisition and very stable non-varying velocity output when the final output is reached. Also, during the track mode, the reply information is used to continually search for reply coincidence which indicates a range closer than that stored in the range register, using logic similar to that used for the search and pretrack modes. Detection of such a coincidence would indicate that the range being tracked is an echo and would force the channel back into the search mode.

The mode status of each channel is used to determine the interrogation frequency of the DME. In the search and pretrack modes, the channel is interrogated each time the SMO 111 and receiver detector 113 are tuned to its associated frequency. This typically occurs at a rate of approximately 28 times per second. In the track mode, the interrogation frequency is reduced to one-fourth, although the scanning rate remains the same.

This allows all three channels to be active without exceeding a maximum interrogation rate of 30 Hz. The cycles not associated with the interrogation are used solely for purposes of determining identity pulse presence. The 28 Hz sampling rate thus allows detection of Morse code dots whose duration is at least 50 ms.

A fourth mode, known as the "no squitter" mode, is also operative in the DME ranging circuit. This mode is commanded by the microprocessor 146 when no replies are being received, and causes all interrogation for that particular channel to be halted. Each of the three channels is operated such that each has independent storage locations for its associated frequency, range, velocity, status, counters and timer, thereby making each channel operate completely independent of the others. Thus, one of the channels may be operating in the search mode while another of the channels is in the track mode and still another of the channels is in the no squitter mode. Likewise, each of the channels may also be in the same mode without affecting the operation of the other channels.

Figure 2:
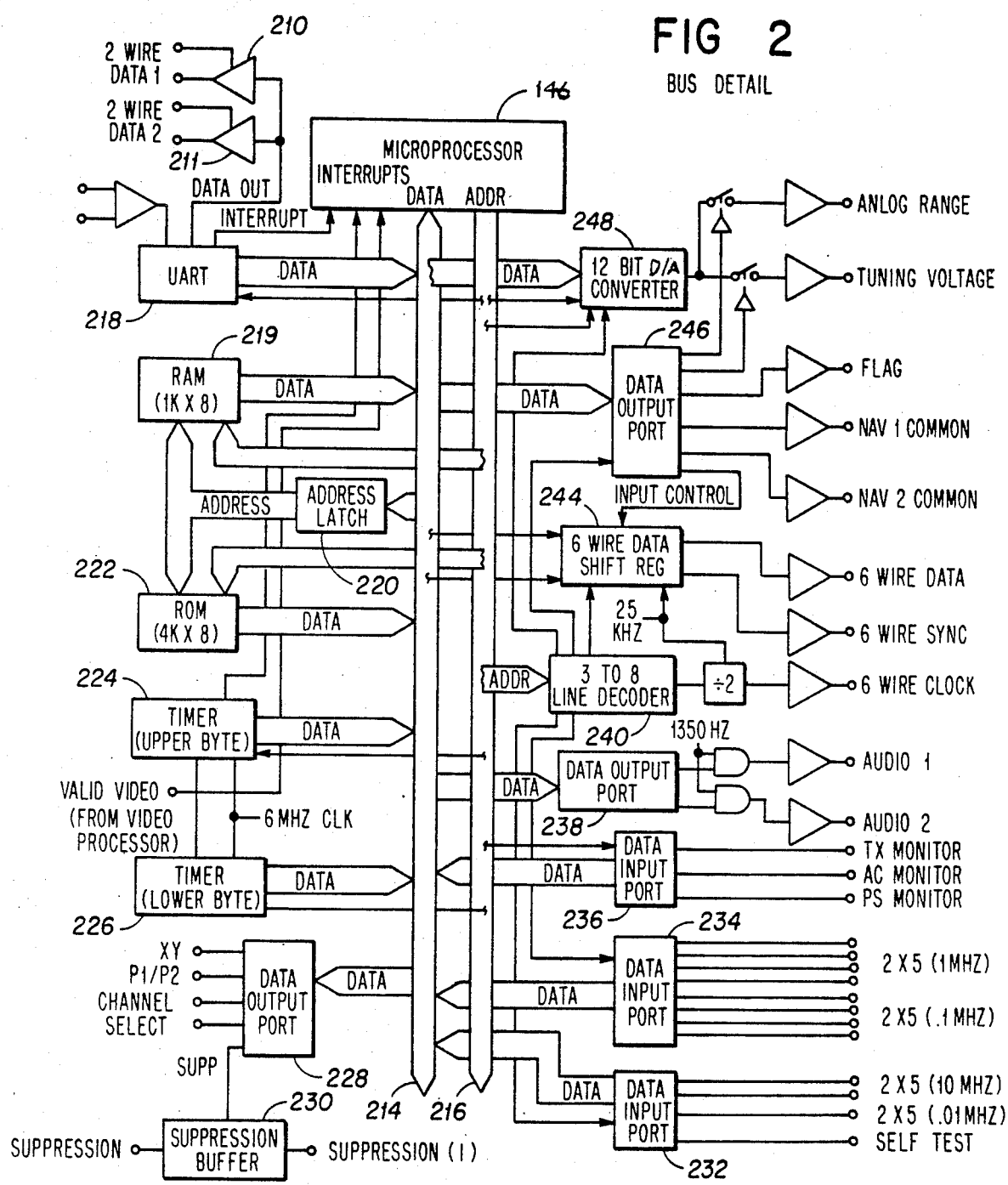
FIG. 2 is a more detailed block diagram of the processor bus detail shown in FIG. 1.

Referring now to FIG. 2 there is shown a more detailed block diagram of the I/O ports and range processor constructed in accordance with the present invention. The I/O and range processor provide the control for all of the DME functions, and in particular provide the transmit gate to the transmitter modulator 110, control the input to the SMO 111, provide the tuning voltage to the receiver detector 113, calculate range, velocity, and time-to-station, decode the Morse code identity, accept either serial or parallel tuning inputs, and provide outputs of range, velocity, time-to-station, and identity for use by a pilot.

Referring first to the transmitter modulator gate and suppression functions of the range processor, the processor generates interrogation pulse pairs (P1 and P2) which are used to trigger the transmitter 112. These transmitted pulses will, upon receipt by DME ground stations, stimulate a response which will in turn be received by the DME for use in determining range to that station for the particular channel being employed. The pulse pair gates are 7 $\mu$S duration TTL level pulses having a spacing of 12-36 $\mu$S for X and Y modes of operation, respectively. The rate at which these pulses are generated is a function of the status of each of the individual channels. For example, if no frequency has been selected for a particular channel and provided as input to the UART 138, or if a squitter has been received from the ground station, the interrogation rate will be zero. Alternatively, when the channel is in the search status, the rate will increase to 28 Hz per channel. Finally, the repetition rate of the pulses will reduce to approxiately 7 Hz when the system has acquired a track status. Assuming that any individual channel will be searching for no more than 5% of the time, the average interrogation rate of the transmitter should not exceed 30 Hz.

For a period of time slightly preceeding the leading edge of pulse P1 and slightly following the trailing edge of P2, an internal suppression pulse is generated. This pulse is used internally by the receiver and diplexer over line 48 and is buffered at 230 to provide a high level output which is available at an external connector to suppress other pulsed equipments. The suppression buffer circuit 230 is configured such that it will also accept the suppression output from other on-board equipment to provide an internal signal to suppress the receiver when other pulsed equipment is operating.

In order to provide ranging information for up to three ground stations, it is necessary that the transmitter and receiver detector frequencies be alternated between each of the selected frequencies. These frequencies are alternated at a rate of approximately 84 Hz to allow a receiver sampling rate of 28 Hz per channel. In operation, one of the channels is selected for interrogation in accordance with the previously described procedure. At the conclusion of that interrogation cycle (or after receipt of the reply during that cycle) the next channel is selected by the microprocessor 146 and that channel provides repetitive pulse outputs in a manner similar to the first channel. Likewise, after the conclusion of an interrogation cycle for the second cycle, the third channel is selected by the microprocessor 146 to provide its interrogation pulses. In each case, a 19-bit serial word corresponding to the frequency of the selected channel is sent to the SMO 111 and an 8-bit word is parallel loaded to the D/A converter 248 to produce the analog voltage necessary to tune the receiver detector 113. Following the output of these two control signals, the processor 146 delays approximately 4 ms to allow slewing of the SMO 111 to the new frequency before interrogation or detection of the video occurs.

The range is computed through the interaction of the video processor 115 and the microprocessor 146 and a 16-bit timer 224, 226 as more particularly shown in FIG. 2. The computation of range is accomplished by starting the timer and enabling the video processor interrupt following transmittal of the P1/P2 pulses in response to keying by the modulator 110. Each subsequently received pulse pair which is decoded by the video processor 115 latches the instantaneous value of the counter and sends an interrupt signal to the microprocessor 146. The microprocessor 146 reads the timer value and stores it in a data acquisition table (DAT) for each listen period which occurs for approximately 6 ms following each interrogation.

At the conclusion of a receiving (listen) period, the microprocessor 146 will perform one of two alternative tasks. If the DME ground station selected has previously been correlated, the internal status within the microprocessor 146 will reflect that the processor 146 should be in the track mode and the processor 146 will track the range with a Type II digital servo loop. If correlation of the returns has not been accomplished, the processor 146 will use the data from the DAT in an attempt to find correlation in the search mode. In the search mode, the DAT information from the current receiving period is compared with the DAT from the previous receiving period. If two nearly equal distances are found in each of the lists, the distance is stored and the mode changed to pretrack where the stored distance is compared to the DAT. The number of interrogations resulting in a successful comparison are then counted, and if sufficient correlation exists, the mode status is changed to track. Alternatively, if sufficient correlation is not found, the mode status again reverts to search and the process continues in the manner described above.

In the track mode, the DAT is compared with the stored distance and if a correlation exists, the distance from the DAT is subtracted from the stored value to determine the error distance. The error distance is then used by a servo loop to update the stored distance. Since the servo loop is a Type II loop (i.e., velocity error is zero for a constant velocity) aircraft groundspeed with respect to the station is one of the loop products and time to/from the station can be calculated by dividing range by velocity. This calculation is made by the microprocessor 146 software as will be described in greater detail below.

The microprocessor 146 also uses the DAT to determine when the ground station is transmitting identity characters. Identity is determined by comparing adjacent times in the DAT and determining whether the time difference is equal to or a submultiple of the reciprocal of 1350 Hz. In the event that a sufficient number of identity intervals are detected in the lists, a bit is set internally to the microprocessor 146 for use by the identity character recognition software and externally to gate an audio tone at one of the AND gates 131, 132, or 133. If after an interrogation and receiving cycle, a sufficient number of identity intervals were not obtained, the bits are reset and the tone turned off for that channel. Internally, the microprocessor 146 uses this identity bit to determine the Morse code dot-dash patterns and converts the dot-dash patterns to ASCII codes corresponding to each character, which are stored for output to the pilot. Again, a more detailed description of the software controlling this process will be provided below.

The system may be operated by having the frequency selection provided by operation of 2×5 parallel inputs or a BCD serial input. The inputs are provided at data input ports 234 and 232. The system operates such that channel A may be controlled by the 2×5 input if the serial/parallel line is left open. In the event that the serial data to any channel is not present for a period of time in excess of one second, the frequency will be set invalid. The BCD serial data inputs are received by a differential line receiver which in turn drives the receiver input of the UART 218. The UART 218 provides an interrupt signal to the processor 146 after eight bits of data, exclusive of stop, start, and parity. The processor 146 continues to store each received byte until a complete word (four data bytes plus label and status bytes) has been received. Upon receipt of a complete word, the processor 146 examines the label to determine if the information is DME frequency. In the event that the word is a DME frequency, the processor 146 will use the source/destination identifier to determine which channel is to be tuned, and converts the BCD frequency data to the 19-bit code discussed previously to drive the SMO 111 and to an 8-bit code previously referred to representative of the voltage required to tune the receiver detector 113 to the desired frequency. When commanded, the 2×5 tuning lines are sampled and the 2×5 code converted to the words necessary to tune the same SMO 111 and receiver detector 113.

Outputs from the DME include six wire serial distance, analog voltage, flag, two audio outputs, and two wire serial data output. The six wire distance data is generated from two 64-bit shift registers 244. Prior to the generation of the data, the shift registers 244 are loaded by the processor 146 with bit patterns representative of the sync pulse and of the required data. Upon command of the processor 146, the data of these shift registers are allowed to be clocked by a 25 kHz signal which is a multiple of the 12.5 kHz clock provided as the external clock output. The analog distance output is generated by a 12-bit D/A converter 248 under control of the processor 146. This converter shares usage as the receiver tuning/voltage generator and thus must be multiplexed to provide both of these functions. The output has a scale factor which provides a maximum output up to 250 miles, in this embodiment. The data appearing at the six wire serial, analog, audio, and flag outputs, may correspond to the data in either channel A or channel B depending on the logic level input to the data output port 246. If the input is left open, the channel A data is used. If the input is grounded, the channel B data is used. In either event, the audio 1 output will be channel A audio Likewise, the two wire data words are frequency/distance, velocity/time-to-station, and identity. Each of the three channels will generate this data and will set the appropriate bits of the source/destination identifier.

Operation of the system as described above is controlled by software programmed in the microprocessor 146. The program code is executed by the central processing unit to provide the necessary interrogation signals, acquire data generated by a ground station, and process the data received from a ground station to derive ranging and identification information. The UART 218 interfaces the CPU to a 12.5 kHz I/O bus to receive tuning information from a frequency control and to transmit distance, ground speed, time-to-station, frequency and identity information to the external indicators for pilot observation as is known in the art.

Identity information is recognized by a recurring interval spacing in the data. An enable signal is generated by the CPU to one of the audio gating circuits each time identity is received to simulate the Morse code station identifier. Thereafter, the dot-dash Morse code patterns are processed to produce the ASCII characters corresponding to the audio station identifier. The information derived from the DME ground station data is converted to required formats and sent out through the UART 218 to the external indicators. Time-to-station information is calculated by a software division of the stored distance and velocity The distance is multiplied by a constant to convert the raw data into a binary form, while velocity and time-to-station are also multiplied by selective constants and further converted to a BCD format in software All channels of the multichannel DME have a status register containing information on the X/Y mode of transmisson, and on one of the four states of the DME ranging processor (no squitter, search, pretrack, track) in which the channel is operating. When activated, the status register is tested to determine whether to interrogate and collect data, or simply to listen to the ground station. Channels are initialized to the no squitter state such that a listen is performed if a signal is available. The CPU looks to see if data is being placed in the data acquisition table as a verification that squitter is available, and if so, increments the channel status to begin the search/track process.

Interrogation signals consisting of the P1/P2 pulse pair and a suppression pulse are sent by the CPU during operation in all of the remaining states. While in the search or pretrack modes, transmissions occur with each pass through the interrogation sequence. In the track mode, a cycle counter is tested and transmissions occur only during selected passes of the sequence. During a no-transmit sequence, a listen is done for station identification. The X/Y bit of the status register causes P1/P2 signals to be sent out in the X mode (7 ms pulse width, 12 ms pulse spacings) or the Y mode (7 ms pulse width, 36 ms pulse spacings). The X/Y signal, generated during the tuning of the DME, relays this mode information to the video processor through input/output port 228 to accept and process X mode pulses (12 ms spacings) or Y mode pulses (36 ms spacings). Data received by the CPU may consist of squitter, identify, and/or the actual reply to the interrogation. When received, data is stored in the DAT on an interrupt basis while the CPU executes other tasks. Each time the video processor decodes a video signal, it instructs the CPU to read and store the state of the distance counter in the DAT. The distance counter is initialized following the P1/P2 transmission so that the counter values in the DAT can be directly converted to distance data. The DAT is defined as the current list of data which is eventually moved to the proper channel data table for testing. A search is performed for ground station replies by comparing newly acquired current lists and transferred lists to find a value common to both. The common value is then determined by subtraction to locate two values within ±0.5 nautical mile of one another. The common value is then stored in the distance memory and the microprocessor 146 initiated to the pretrack mode.

In the pretrack mode, the distance memory is compared with each new DAT. A memory counter for the channel keeps track of the number of successful/unsuccessful comparisons by incrementing the memory counter with each valid comparison and decrementing the counter with each invalid comparison, as previously described. When an adequate number of comparisons has been made, the signal is tracked. Alternatively, when the adequate number is not obtained, the signal resorts to search mode.

During tracking, the pretrack procedure is continued. This procedure will provide a channel reset after 10 seconds if replies are not received. In addition to the list comparing, the Type 11 servo loop is initiated to provide a window in which the reply signals must occur for the channel to remain in the track mode and to provide a ground speed value stable enough for display.

Identity information is sent from the ground station at a 1350 Hz rate. At this time, the data in the DAT are uniformly spaced to signify reception of identity by the DME. When the recurring intervals are detected, an audio enable signal gates a tone generator to drive the audio circuit through one of the AND gates 131, 132 or 133 as a function of the respective channel. This gating provides an audio simulation of the dots and dashes of the Morse code identifier which are also stored in an identity memory register and later converted to ASCII characters by use of a look-up table in the ROM 222. Loss of the identity signal for approximately one to one-and-a-half minutes will cause a channel reset. All of the data are converted to usable formats before being sent out to the external indicators for pilot observation. A two-byte software multiplication by selected constants converts distance, velocity, and time-to-station data into binary form while velocity and time-to-station are further converted to BCD data. After completion of the data conversions, it is stored in an output list ready for transmission and sent to the external indicator via the UART 218 in 6-byte blocks containing either frequency and distance, identity, or velocity/time-to-station information. Communication between the CPU and the UART 218 is provided by an interrupt line which signals the CPU at the completion of transmitting each byte of the block. After each interrupt, the CPU loads a byte of data into the UART, which in turn sends out the data in a serial fashion at a 12.5 Hz rate. The block contains data type label, actual data, and control bits inserted by the UART. One block of the data takes approximately 5.2 ms to be transferred from the CPU to the UART 218 and thence to the external indicators.

In addition to the two-wire serial data, the processor 146 converts the distance word for channel A to a 12-bit word which is provided to the D/A converter with a scale factor. It also converts the range data from the selected channel to BCD and serial loads this data along with the appropriate label and control bits into shift register 244 for output in a 6-wire set format. Input tuning data may be received from either of two sources. One of the sources of two-wire serial input which is received by the same UART 218 is used for data transmission. The UART 218 receiver interrupts the processor 146 after each byte of data is received to allow loading and storage by the processor 146. A special break detect indication is available from the UART 218 when the sync byte is received, thus allowing the processor 146 to determine the byte sequence. Alternatively, the second input tuning source is in 2×5 parallel data. Eleven parallel input lines are read periodically by the processor 146 and the 2×5 code converted to data which is needed to tune the SMO 111 and receiver detector 113. In the event that both serial and parallel data are present, the serial data has precedence over the parallel data.

Figure 3:
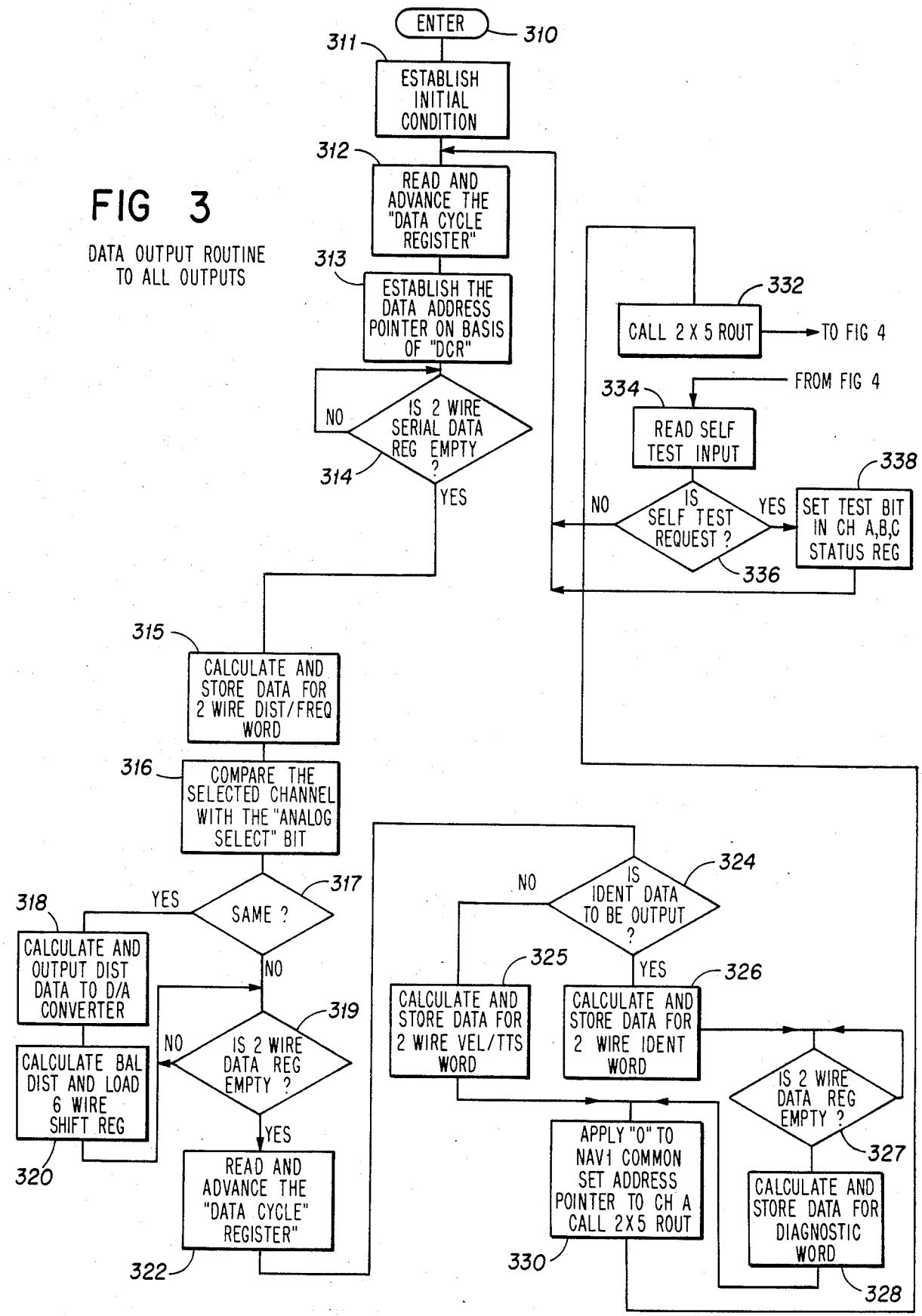
FIG. 3 is a flow diagram showing the primary microprocessor control routine for use in connection with the system of FIG. 1.
Figure 4:
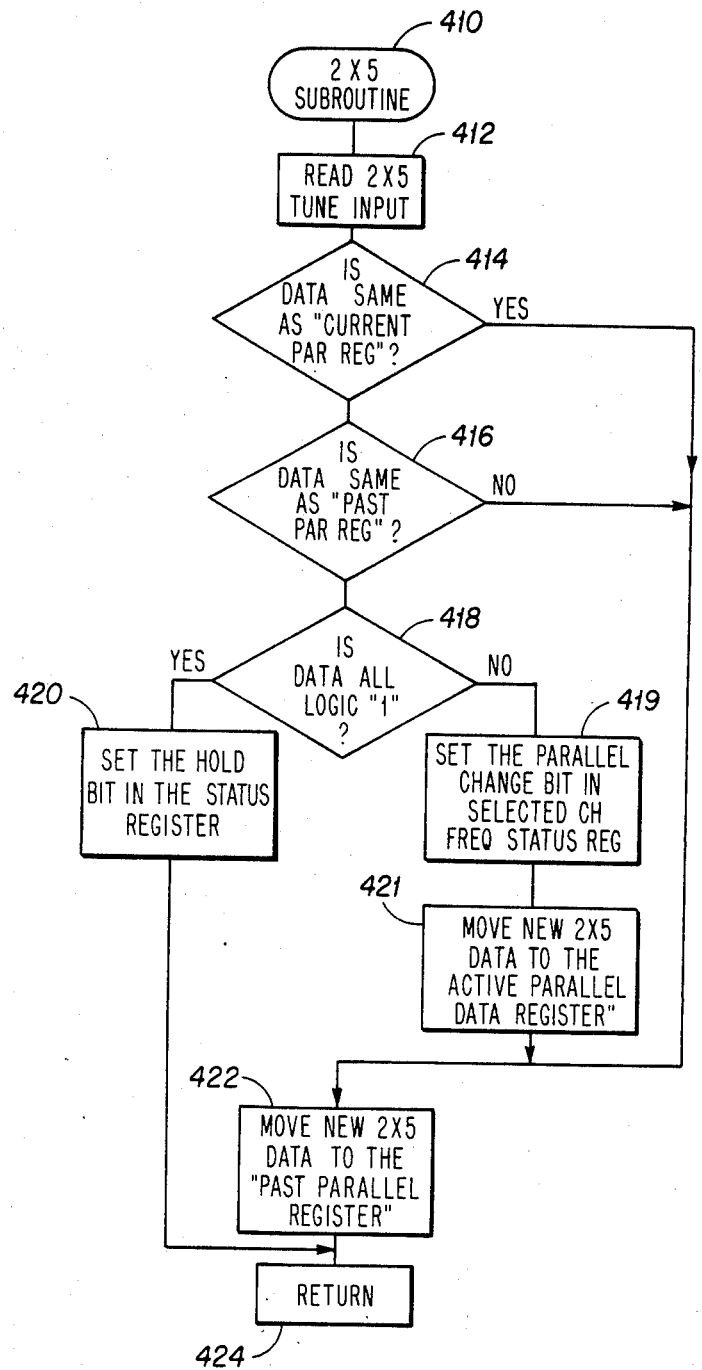
FIG. 4 is a flow diagram representing a microprocessor interrupt routine used in connection with the system of FIG. 1.
Figure 5:
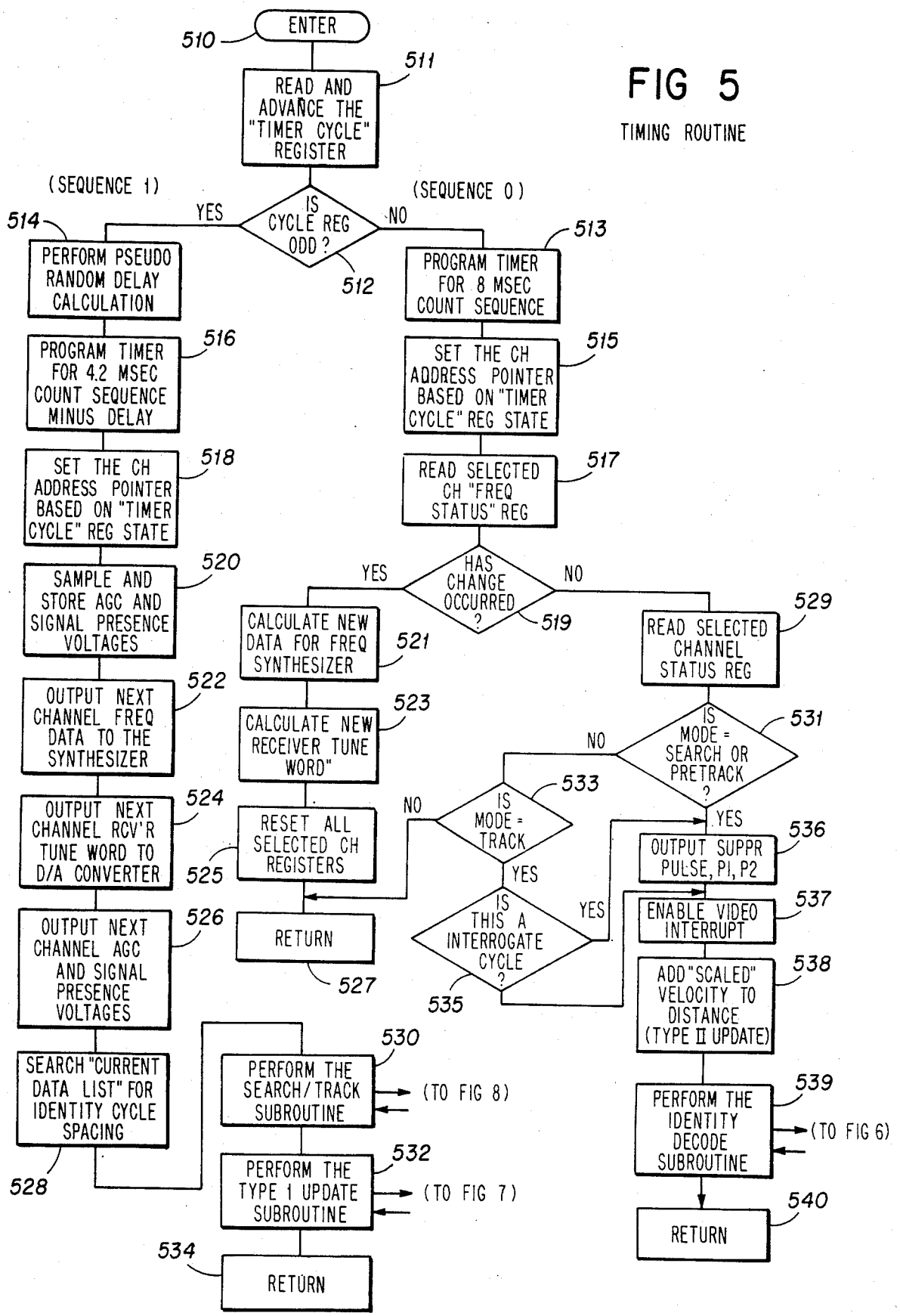
FIG. 5 is a flow diagram representing the timing routine for proper tuning control.

The software program consists of a primary routine and several interrupt routines. The primary routine which is shown in FIG. 3 initializes all memory elements upon power up, calculates and stores data for output, and reads the 2×5 parallel tuning lines as shown in FIG. 4. The interrupt routines consist of the timer routine of FIG. 5, which includes the identity decode subroutine of FIG. 6, the update routine of FIG. 7, and the search/track routine of FIGS. 8, 8a and 8b; and the video processor interrupt routine of FIG. 9. The timer interrupt programs of FIG. 5 are entered by timer overflow interrupts. The timer software provides for interrogation control and performs those tasks which must be accomplished during each interro9ate or listen cycle. The video processor routine shown in FIG. 9 allows interruption of the processor 146 to read the timer each time a valid pulse pair is decoded, and thus loads the data acquisition table. The UART routine, not shown, is a commonly used UART routine as is known in the art and provides the vehicle for loading/storing data to/from the UART 218.

Referring now to FIG. 3, the primary routine is entered from the microprocessor 146 reset input. After establishing initial conditions 311, the program reads the data cycle register 312 to determine which channel and which data are to be loaded for the next output. If the serial data registers are empty 314, indicating the previous data has been transmitted, it performs the computation necessary 315 to load the next word. If the channel for which data is being loaded is the channel selected by the data output port 316, 317, six-wire data is loaded to the six-wire data shift register 318, 320 and the D/A distance word calculated and loaded to the D/A converter for transmission to the D/A converter 248. At this point, a determination of track mode (identity information to be determined) is made, 324. The appropriate calculation and storage is made, 325, or 326, 327, 329, and the 2×5 routine of FIG. 4 is called, 330, 332. Upon completion of data output for one of the channels, the 2×5 input lines are sampled to determine selected frequency. A self-test subroutine capability is also included and shown as blocks 334, 336 and 228 after return from the 2×5 routine of FIG. 4. The program then cycles to the next channel and repeats the calculations in a manner shown by the flow diagram of FIG. 3.

Referring now to FIG. 4, the 2×5 tuning routine (parallel tuning routine) consists of the call-out for the 2×5 subroutine 410, thereafter the 2×5 tuning input is read, 412, and the data obtained is compared with the current parallel register 414. If the same, the software routine goes directly to move the new 2×5 data to the past parallel register 422 and thence return to the primary data output routine of FIG. 3. Otherwise, the data is then compared to that contained in the past parallel register 416 and if dissimilar, the 2×5 tuning routine is exited as above. If the same, the data is tested for all logic "1"s, 418.

If so, the hold bit in the status register is set, 420, and the control is returned to the primary data routine of FIG. 3. If not, the parallel change bit is set in the selected channel frequency status register 419 and the new 2×5 data is moved to the active parallel data register 421, the old active parallel data is moved into the past parallel register 422 and the subroutine is exited 424 to return to FIG. 3 block 334.

The timer routine shown in FIG. 5 consists of two subroutines which are executed on alternate interrupts 511, 512 from the timer. On even number interrupts, the processor programs the timer for an 8-ms interval (sequence O) 513. It then determines which of the three channels is selected for this period 515 and once the channel has been selected, the frequency status register is examined 517, 519 to determine whether a frequency change has been received. If a change has occurred, new SMO 111 and receiver detector 113 control words are calculated 521, 523 and stored. If no change has occurred, an interrogate or listen cycle is started 529, after which the Type II update 538, identity decode 539, and start UART transmit subroutines are executed, unless the channel is not in the track mode 533. On odd number interrupts, a pseudo-random delay is calculated 514, the timer is programmed for a 4.2 ms interval 516, the SMO 111 and receiver detector 113 programmed for the next sequence 518, 520, 522, 524, 526, 528, and the search/track and update subroutines as shown in the flow diagrams of FIGS. 7 and 8, performed 530, 532. The video processor interrupt as shown in FIG. 9 is enabled during the sequence of the timer routine, allowing compilation of the DAT.

The UART interrupt is enabled at all times except during the period when the interrogation pulses are being generated and while video interrupts are in process. Interrupts are generated by the UART whenever the receiver buffer is full, the transmit buffer is empty, and the transmitter is enabled. The UART transmitter is enabled during the sequence of the timer routine and is disabled following completion of the message by the UART routine. During the message transmission, the processor is interrupted each time the transmit buffer is empty, and the UART routine loads the next byte of data. If the interrupt was caused by the receiver buffer being full, the processor reads the receiver byte and stores it in memory. If the byte of the receiver was the sync byte, the routine causes the received data to be resynchronized.

From the detailed flow diagrams of FIGS. 4–9, it is apparent that the appropriate processing to accomplish the above functions may easily be implemented using conventional programming techniques. However, a more detailed discussion of the DME Morse code identifying subroutine and control as set forth in FIG. 6 will now be described. The program shown in FIG. 6 uses information already available from the microprocessor based ranging circuit shown in FIG. 1 to determine the identity characters 611. The information required for this calculation consists of periodic samples of DME ground station replies taken at not greater than 40 ms intervals for durations of not less than 5 ms. The reply information is stored in a digital form corresponding to the relative time received by the DME. At the conclusion of a sampling period, each reply time is subtracted from each of the next two subsequent reply times. Each difference which is equal to 740 or 1480 ms (1/1350 Hz or 2/1350 Hz) is counted. If the total count for the previous two samples is approximately 40% of the total number expected during an identity period, the sample is considered to be an identity period sample 612. The result of the identity detection sequence is stored by rotating the logic level representing the result (1 equals identity, 0 equals not-identity) into a 9-bit shift register with the oldest sample discarded. The content of the register then becomes the basis for the subsequent decoding.

The software routine which decodes the characters requires 13-byte wide storage locations in addition to the register mentioned above. These 13 locations consist of a character counter which keeps track of which of the up to four characters of the identifier is being processed, a current character register which maintains a record of the dots and dashes of the character being currently revised, a four-byte character register which contains the ASCII equivalent of the characters decoded during the most recent identification cycle, a four-byte register containing the result of either the previous identifier or the validated identifier, one second end-of-word timer, and a no-identity timer which has a period of 1.5 minutes.

Referring again to FIG. 6, the routine operates generally as described below. If the last bit is zero, indicating no ID 612, the previous seven bits are compared to see if they are numeral 1, 614, and if so, the current character register is rotated, 616, to add a dash to the register and thence return, 618. If not, the previous two bits are compared to the numeral 1, 617, and if so the current character register adds a 1 (dot) to the register 619 and thence return, 618. If not, the routine tests the previous six bits are equal to zero, 620. If not, the routine proceeds to return 618. If yes, the current character register is read, 622, and tested to determine if it contains dots or dashes, 24. If so, the Morse code is converted to ASCII code 630 and the appropriate stored ID character based on the ID character counter register 632 is selected and compared with the current character register, with the character counter register 634. If they are the same 636, the character validity bit equals valid is set and the character compare bit is reset, 644. Additionally, the ID timer register is reset 628 and thence to return 618. However, if not, the character compare bit is tested 638 to determine if set. If it is set, the new character is loaded to current character register with validity set not valid 642. Otherwise, the character compare bit is set, 640, thence through the ID timer register 628 to return 618.

If the current character register does not contain dots or dashes 624, the ID word timer register is incremented 625 and timing checked 626 to direct return to 618 or if so, to reset the ID character compare register 627 thence through the ID timer register 628 to return 618.

Figure 6:
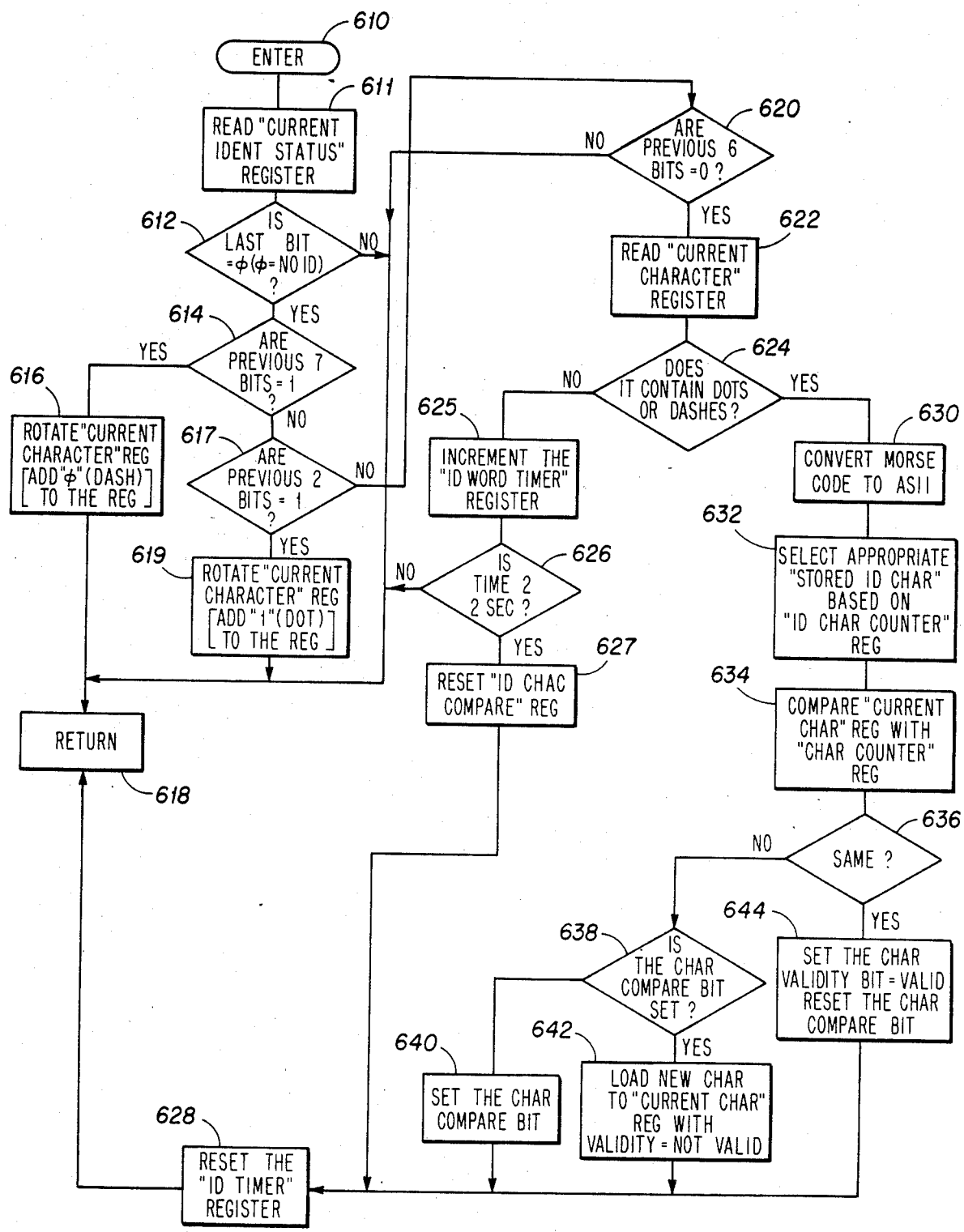
FIG. 6 is a flow diagram of a microprocessor identity decoding routine used in connection with the system of FIG. 1.

Each time a compare is made with a recorded character of the sequence, the no identified timer is reset. If no reset is received within 1.5 minutes, the timer will reach its terminal state and reset all of the past character registers to invalid. The data generated by the identity decoder routine of FIG. 6 is provided as output via the DME serial output but to an external indicator.

This method for decoding identity information utilizes the pluarality of cyclical discrete periods of reception for a time-multiplexed DME receiver as described herein in an interleaved and cooperative manner to decode the identity information for each of the one, two, or three DME transmitting stations essentially simultaneously. During cycle A, for example, a pulse received from DME ground transmitter A is registered and a timing sequence in response to the registering is initiated wherein the sequence has a specified time-out. If during that period or a subsequent period for channel A, a second received pulse from the same transmitter is substantially coincident with the specified time-out, a hit is indicated and stored. The number of hits obtained during each discrete period are summed with the number of hits obtained in the immediately-subsequent discrete period designated for the same transmitter. Thereafter, an identity segment is indicated as a direct function of the total of the summed hits exceeding a predetermined threshold for each of the discrete periods; and monitoring the number and relationships of those discrete periods having an identity segment indicated facilitates decoding the identity information.

This process is additionally conducted, in preferred embodiments, by registering a plurality of pulses from the same transmitter received at different times during the same discrete period, and initiating a timing sequence having a specified time-out for each of the registered pulses, and indicating a hit for each subsequent pulse substantially coincident with the specified time-out for any of the pulses previously registered within the same discrete period.

In addition to registering a plurality of pulses with a first specified timing sequence, a plurality of specified time-outs for each timing sequence initiated, with each time-out having a different duration wherein each of the plurality of time-outs is related to the shortest time-out for that sequence by an integer multiplier, and indicating a hit for each subsequent pulse substantially coincident with any of the plurality of specified time-outs for each of the registered pulses. This technique enables a much more rapid data acquisition and channel confirmation technique, particularly in adverse electromagnetic propagation conditions where one or more signals may be lost or obscured by static.

Figure 7:
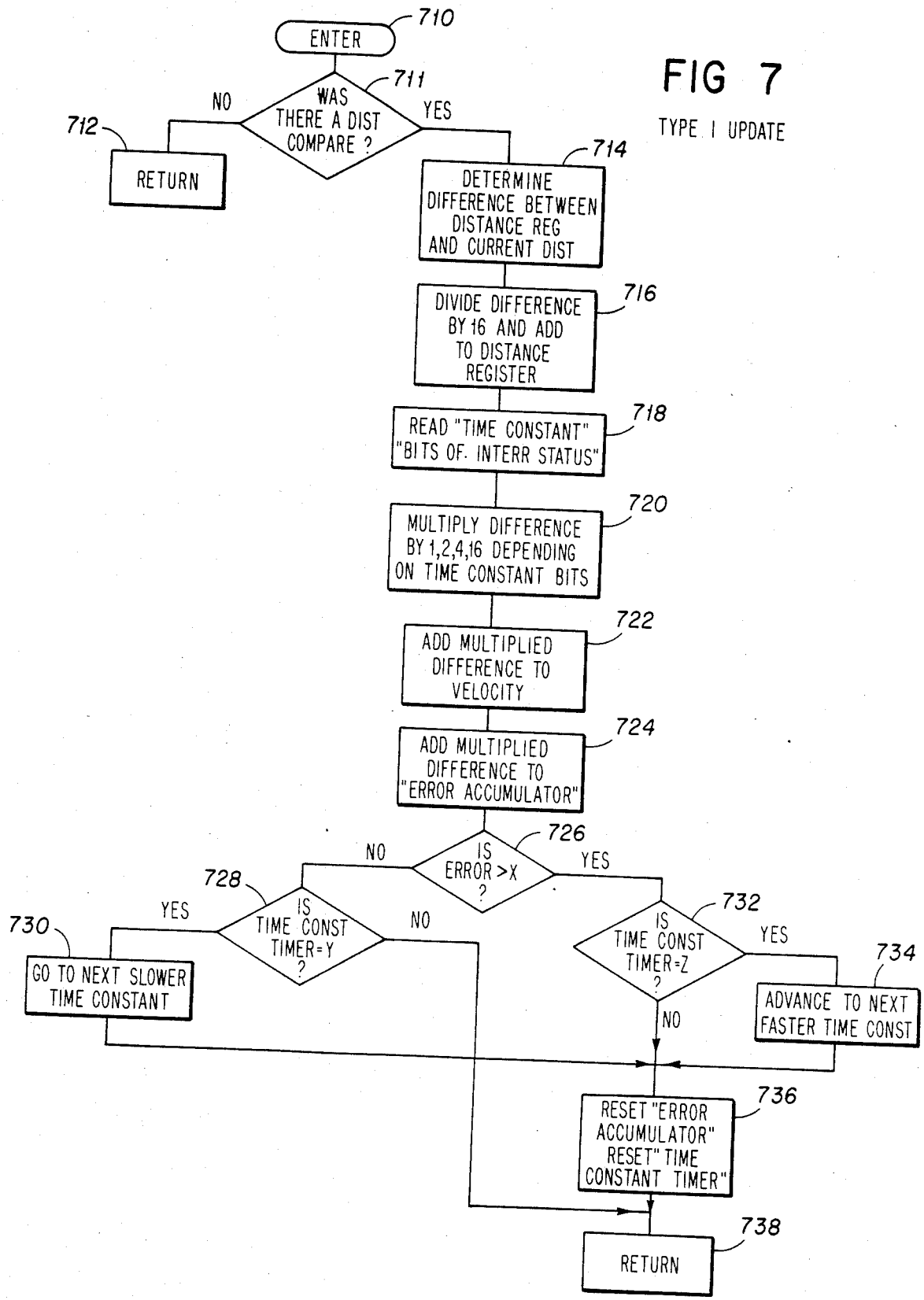
FIG. 7 is a flow diagram showing a microprocessor update routine for distance and velocity measurements used in connection with the system of FIG. 1.

Referring now to FIG. 7, the Type I update subroutine is entered 710 from the timing routine in FIG. 5, 532. The Type I update (FIG. 7) first determines whether there was a distance compare, 711, and if not returns to the timing routine of FIG. 5. If there was a distance compare, however, a difference is determined from the distance register and the current distance stored, 714, divided by sixteen, 716, and added to the distance register. The time constant bits of the interrupt status 718 are read and the difference is multiplied by one, two, four, or sixteen, depending on the value of the time constant bits 720. The multiplied difference is added to the velocity 722 and the multiplied difference is added to the error accumulator 724. The error is then compared to a predetermined factor X for determination whether the time constant should be advanced to the next faster time constant 734, or to the next slower time constant 730, and the error accumulator and time constant timer are reset 736 with the appropriate values and returns 738 to the timing routine of FIG. 5.

Figure 8:
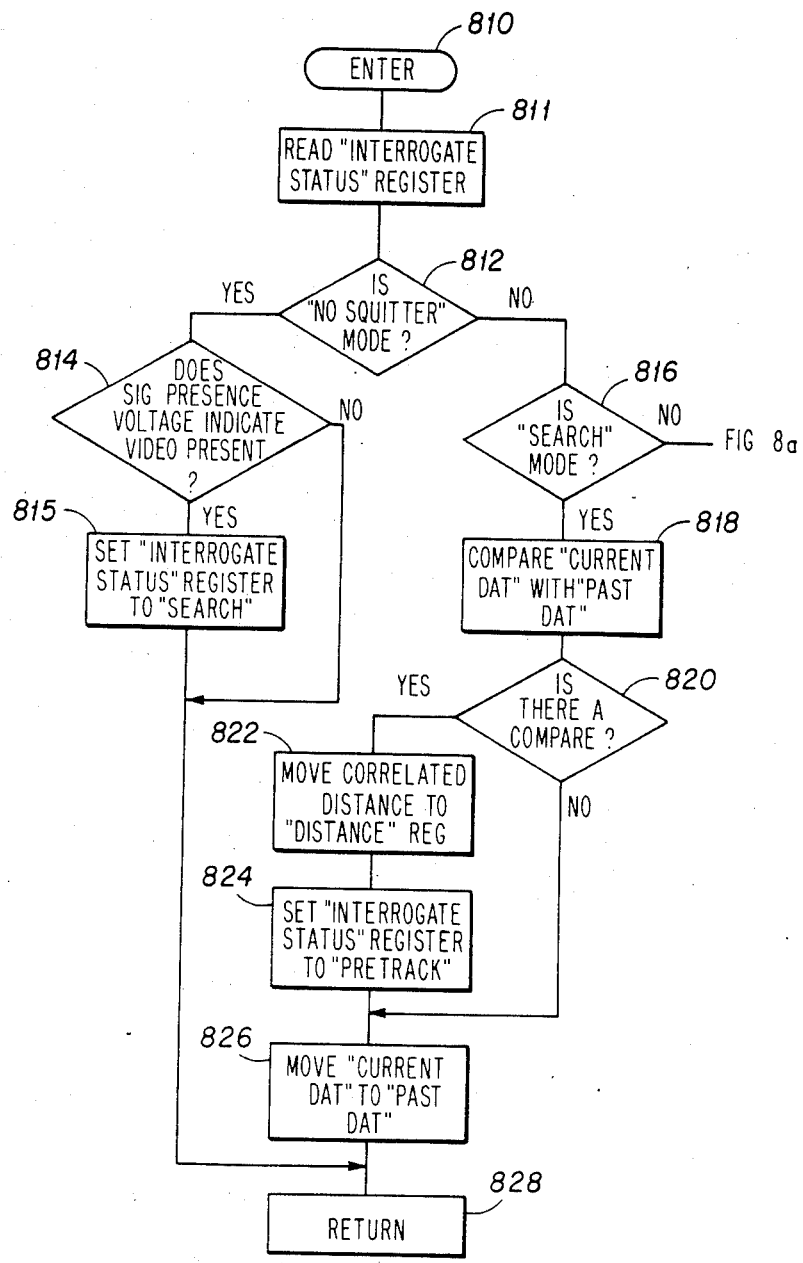
FIGS. 8, 8a and 8b are flow diagrams showing the microprocessor search and track routines used to control the system of FIG. 1.
Figure 9:
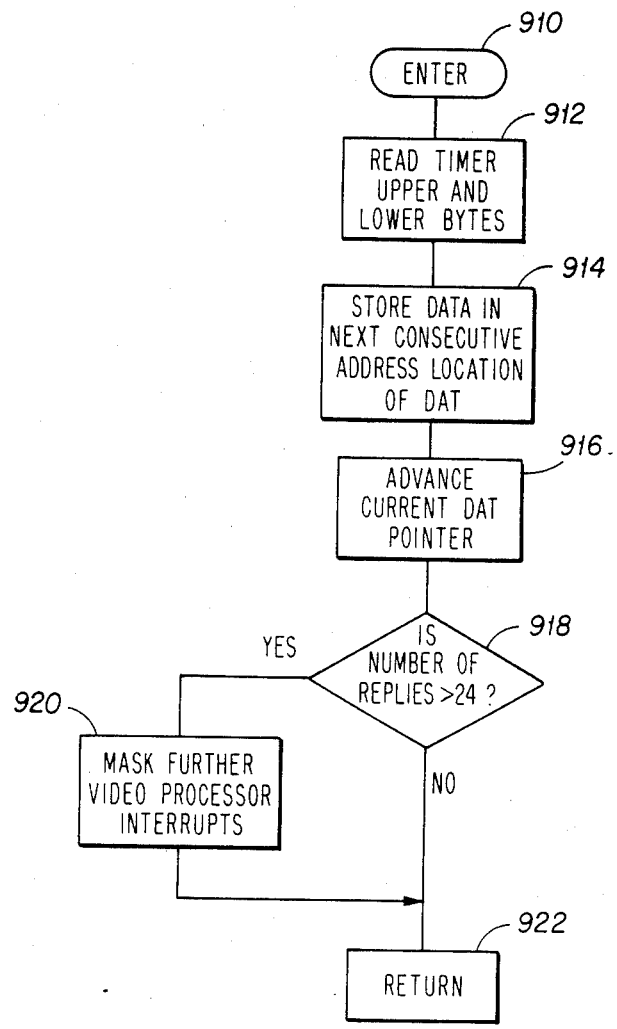
FIG. 9 is a flow diagram showing a microprocessor routine for video processor control used in connection with the system of FIG. 1.

Referring now to FIG. 8, the search track routine is entered 810 from the timing routine of FIG. 5, 530. The interrogate status register is read 811 to determine if that particular channel is in the no squitter mode 812. If it is, the signal present voltage is tested to determine if video signal is present, 814, and if so, the status of the interrogate status register is set to "search" 815, and thence to return 828.

If not in the no squitter mode, a determination is made if the channel is in the search mode, 816. If so, the current data acquisition table is compared with the past data acquisition table 818 and if there is a valid compare 820, the correlated distance is moved into the distance register 822 and the interrogate status register is set to "pretrack" 824. The current data acquisition table is moved to the past data acquisition table location 826, thence to return 828. If a valid compare is not obtained, 820, the current DAT is moved to past DAT thence to return 828.

Alternatively, if the interrogate status register is not in no squitter mode 812 nor in search mode 816, the echo monitor is interrogated (referring to FIG. 8a) 830 to determine if that monitor is in the search mode.

Figure 8A:
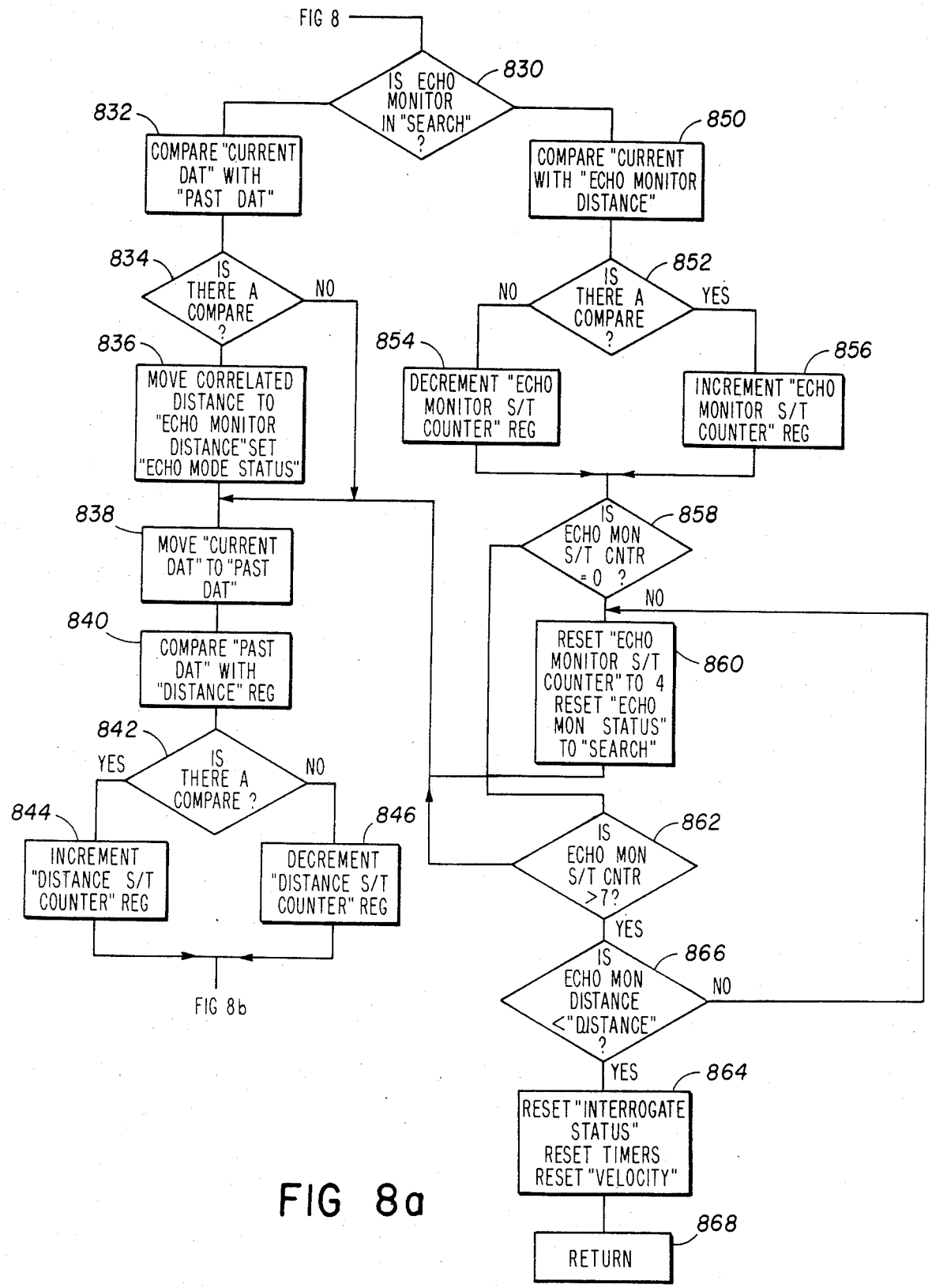
Figure 8B:
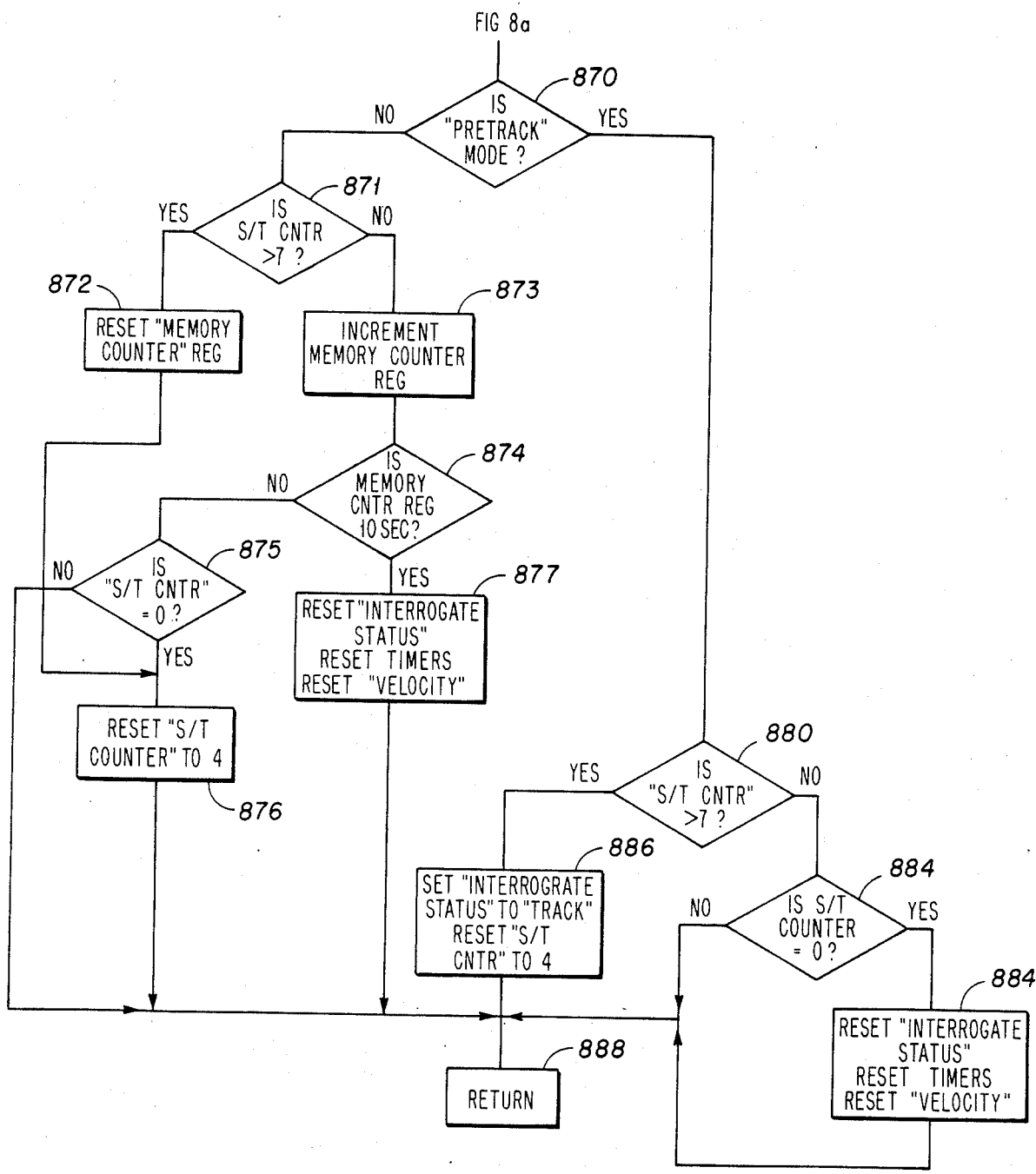

The portion of the subroutine shown in FIG. 8a comprising blocks 832, 834, 836, 838, 840 and 842 determine whether the distance search track register should be incremented 834 or decremented 836, and thence proceed to FIG. 8b after the correlated distance to the echo monitor distance is set to the echo mode status. The echo monitor routine comprising blocks 850 and 852 determines whether the echo monitor search track counter register is incremented 856 or decremented 854 and proceeds through the echo monitor search track counter subprogram to determine if an echo is currently being tracked. If the echo monitor distance is greater than seven, 862, the program is returned to move the current DAT to past DAT 838, thence through the same portion of the subroutine causing an increment 844 or decrement 846 in the distance search track counter registers. If the echo monitor distance is less than the distance tracked, 866, then the interrogate status, timers, and velocity are all reset 864 and thence returned to the timing program of FIG. 5.

In any case where the past DAT is replaced with the current DAT, 838, and the distance search track counter register is incremented or decremented, the subroutine moves to that shown in FIG. 8b to determine if the mode is pretrack 870. In FIG. 8b, if not in the pretrack mode 870, the search track counter is examined 871 and if greater than seven, the memory counter register is reset 872, and the search track counter is reset to four, 876, thence to return 888 to FIG. 5. If the search track counter is equal to or less than seven, 871, then the memory counter register is incremented 873 and timing is tested to determine if the memory counter register is ten seconds 874. If not, the search track counter is tested to determine if zero 875 and thence to return 888.

If the counter register 874 is ten seconds, then the interrogate status, timers, and velocity are reset 877 to allow the circuitry and program to confirm the proper station, distance, and other information by once again proceeding through the search, pretrack, and track modes; thence to return 888.

If the system is in pretrack mode 870, and the search track counter is determined to be greater than seven, 880, then the interrogate status register is set to "track" and the search track counter is set to four, 886, thence to return 888. Alternatively, if the search track counter is less than or equal to seven, 880, the search track counter is tested to determine if equal to zero, 884. If not, the program immediately returns 888; if so, the interrogate status, timers, and velocity registers are reset 884, thence to return 888.

It can be seen from the above description that the software implementation is relatively straightforward and is of a nature that can be implemented in a variety of ways to obtain the same result.

Referring now to FIG. 9, the video interrupt routine is entered 910 upon receipt of the appropriate signal from the video processor 115 in FIG. 1, and the timer upper and lower bytes are read 912, and stored in the next consecutive address location of the data acquisition table 914, the current DAT pointer is advanced 916, and the number of replies is tested to determine if greater than twenty-four, 918. If so, the video processor interrupts are masked from further initiating the video interrupt routine of FIG. 9, 920, thence return the microprocessor to the main program operation, 922. If the number of replies is less than or equal to twenty-four, 918, the subroutine returns directly to the master program 922.

The procedure described herein enables a DME apparatus to identify and monitor at least three distance measuring equipment ground stations at a frequency sufficient to obtain distance information decoded from each of the stations on a repetitive basis sufficiently rapid to obtain two valid distance information decodes in 100 milliseconds, thus enabling a direct comparison to validate the information. Additionally, the frequency of cyclical operation is low enough to obtain valid distance return information at a range of at least 300 nautical miles, in consideration of the time required for returns to the DME. Thus, although more channels could be simultaneously monitored utilizing the present method, the primary advantage of obtaining a triangulated position and other information, is offset against the necessary time required to obtain valid return from the DME ground stations at distances of 300 miles or more.

The computer program content listing is appended hereto as Appendix A1, in compliance with 35 USC 112. The appendix is specifically directed to software specifications utilized in the operation of the exemplary embodiment described in detail in this application.

As will be apparent from the above description, the described system provides a multichannel DME ranging circuit and multichannel DME system which is capable of receiving DME ranging information from three channels. The same system is capable of easily recognizing and identifying the Morse code dot/dash patterns of the particularly selected ground station for each of the three channels. In accordance with this operation, the ranging information may be used to provide a fix on the position of an aircraft without the use of conventional VOR circuits and with improved accuracy due to the digitally implemented DME system. Operation of the system under the control of the microprocessor enables fast response times and additionally provides accuracy indications of velocity, time-to-station, and identity information. All of these enable more versatile use of a DME and more efficient usage of aircraft space and instrumentation. All of these are advantages and features which are not recognized or taught by the prior art.

While the invention has been described with reference to particular digital circuits and programming, it is apparent that other circuits and techniques may be utilized to implement the functions described. It is therefore to be understood that many obvious variations and modifications may be made in light of the above teachings. It is therefore to be understood that within the scope of the appended claims, the invention may be practiced otherwise than as specifically described.

APPENDIX A1
TABLE OF CONTENTS

| PARAGRAPH | TITLE | PAGE |
|---|---|---|
| 1.0 | SCOPE | 1 |
| 2.0 | GENERAL INFORMATION | 1 |
| 3.0 | HARDWARE SUPPORT | 1 |
| 4.0 | INITIAL CONDITION SOFTWARE | 3 |
| 5.0 | FREQUENCY CONTROL | 4 |
| 6.0 | MULTI-CHANNEL OPERATION | 6 |
| 7.0 | RANGING ALGORITHMS | 7 |
| 8.0 | IDENTITY DETECTION AND DECODING | 9 |
| 9.0 | DATA OUTPUTS | 10 |
| 10.0 | SELF TEST AND DIAGNOSTICS | 12 |
| 11.0 | SPECIAL TEST INPUTS | 13 |
| APPENDIX A | | 14 |

DME-42 SOFTWARE SPECIFICATION

PREPARED BY: DAVE NELSON
DATE: 8 APRIL 1983

1.0 SCOPE

THIS DOCUMENT DEFINES THE TASKS WHICH THE MICROPROCESSOR IN THE DME-42 DISTANCE MEASURING EQUIPMENT MUST PERFORM. THESE SPECIFICATIONS WILL BE CHECKED AGAINST THE FINAL SOFTWARE DESIGN TO INSURE THAT THE PROCESSOR FUNCTIONS AS INTENDED.

2.0 GENERAL INFORMATION

THE DME-42 IS A DISTANCE MEASURING EQUIPMENT AS DEFINED IN RADIO COMMISSION FOR AERONAUTICS (RTCA) DOCUMENT D.O. 151A. THE DME-42 SYSTEM REQUIREMENTS ARE DEFINED IN CPN 670-0803-001, DME-42 EQUIPMENT SPECIFICATION.

THE MICROPROCESSOR WITHIN THE DME-42 CONTROLS THE OPERATION OF ALL OTHER FUNCTIONS WITHIN THE DME. SOME OF THE FUNCTIONS CONTROLLED ARE:

(A) STABILIZED MASTER OSCILLATOR (SMO) TUNING
(B) RECEIVER PRESELECTOR TUNING
(C) TRANSMITTER MODULATION
(D) VIDEO DECODER MODE SELECTION
(E) INPUT FREQUENCY RECEPTION
(F) RANGE (DISTANCE, VELOCITY, AND TIME) CALCULATION
(G) IDENTITY DECODING
(H) SERIAL DATA OUTPUTS
(I) SIX-WIRE AND ANALOG RANGE OUTPUTS
(J) SELF TEST STIMULATION AND MONITORING 3.0 HARDWARE SUPPORT

THE MICROPROCESSOR WITHIN THE DME-42 IS AN 8085A PROCESSOR. THE SOFTWARE IS CONTAINED WITHIN A 2732, 4K X 8 EPROM WHOSE ADDRESS IS FROM 0 TO FFF HEX. 1K X 8 OF RANDOM ACCESS MEMORY IS AVAILABLE AT ADDRESS 2000 TO 23FF HEX. FOLLOWING IS A LIST OF OTHER PERIPHERALS AVAILABLE TO THE PROCESSOR:

3.1 TIMER

A 16 BIT TIMER IS AVAILABLE TO THE MICROPROCESSOR. A BUFFERED OUTPUT OF THE UPPER EIGHT BITS OF THE TIMER MAY BE READ BY ADDRESSING 3XXX HEX (X INDICATES DON'T CARE) AND THE BOTTOM EIGHT BITS MAY BE READ BY ADDRESSING 4XXX HEX. THE BUFFERED VALUE OF THE TIMER IS NOT THE TIME CURRENTLY IN THE TIMER, BUT IS RATHER THE TIME THAT WAS PRESENT WHEN THE LAST VALID VIDEO PULSE PAIR WAS DETECTED. THE TIMER CAN HAVE ITS UPPER BYTE SET TO A NEW VALUE BY WRITING ADDRESS 3XXX HEX. THE ACTION OF WRITING TO THE UPPER BYTE WILL ALSO RESTART THE LOWER TIMER BYTE.

3.2 UART

AN INTEL 8251A UNIVERSAL SYCHRONOUS/ASYNCHRONUS RECEIVER/TRANSMITTER (USART) IS AVAILABLE AT MEMORY ADDRESS 10XX AND 11XX HEX. THIS I.C. IS USED TO TRANSMIT AND RECEIVE SERIAL DATA TO/FROM THE EXTERNAL CONNECTOR J1. THE SERIAL DATA FORMAT REQUIRES THAT THE USART BE PROGRAMMED TO RUN IN THE ASYNCHRONOUS MODE WITH THE WORD LENGTH SET TO 8 BITS AND UTILIZING ODD PARITY AND A SINGLE STOP BIT. THE RECEIVER AND TRANSMITTER CLOCK FREQUENCIES ARE 200 KHZ., REQUIRING THAT THE UART BE PLACED IN THE DIVIDE BY 16 MODE TO PROVIDE THE 12.5 KHZ BAUD RATE REQUIRED. ADDRESS 10XX ADDRESSES THE DATA READ/WRITE BUFFER; ADDRESS 11XX ADDRESSES THE COMMAND/STATUS REGISTER.

3.3  DIGITAL/ANALOG CONVERTERS

TWO D/A CONVERTERS ARE AVAILABLE TO THE PROCESSOR. THE ONE DAC IS AN ANALOG
DEVICES 7542 12 BIT UNIT AND IS USED TO PROVIDE THE ANALOG RANGE OUTPUT. SCALE
FACTOR OF THIS UNIT IS 2.5 MILLIVOLTS PER BIT. THIS DAC IS ADDRESSED AS AN I/O
PORT, WITH THE LEAST SIGNIFICANT NIBBLE ADDRESSED AS 8, THE SECOND NIBBLE
ADDRESSED AS 4, AND THE MOST SIGNIFICANT NIBBLE ADDRESSED AS C HEX. NEW DATA IS
LOADED TO THE DAC OUTPUT BY WRITING PORT 0.

THE SECOND DAC IS AN EIGHT BIT 1508 D/A CONVERTER. THIS DEVICE IS USED TO
OUTPUT THE RECEIVER TUNE VOLTAGE, TO LOAD THE AGC CAPACITOR, TO LOAD THE AVERAGE
VIDEO VALUE CAPACITOR, AND TO FUNCTION ALONG WITH A COMPARATOR AS A SUCCESSIVE
APPROXIMATION A/D CONVERTER TO SAMPLE THE ANALOG VOLTAGES PRESENT ON THE AGC AND
AVG. VIDEO VALUE CAPACITORS. THIS DEVICE IS ADDRESSED AS I/O PORT 12 HEX.

3.4  INPUT PORTS

THREE INPUT PORTS ARE ACCESSIBLE BY THE PROCESSOR. TWO PORTS ARE ADDRESSABLE AS
I/O PORTS, THE THIRD PORT IS ADDRESSABLE AS A MEMORY DEVICE.

THE MONITOR PORT IS ADDRESSED AS MEMORY ADDRESS 7XXXH. INPUTS TO THIS PORT ARE:
    BIT 0 - POWER SUPPLY MONITOR
    BIT 1 - SMO LOCK MONITOR
    BIT 2 - TRANSMIT POWER MONITOR
    BIT 3 - ANALOG/6-WIRE 1/2 SIDE SELECT
    BIT 4 - A/D COMPARE INPUT
    BIT 5,6 - TEST MODE INPUTS
    BIT 7 - PARALLEL / SERIAL INPUT SELECT

THE LO2X5 PORT CONTAINS THE .1 AND 1 MHZ PARALLEL TUNING INPUTS. THIS PORT IS
ADDRESSED AS I/O PORT 3 AND HAS THE FOLLOWING INPUTS:
    BIT 0 - .1 MHZ - A
    BIT 1 - .1 MHZ - C
    BIT 2 - .1 MHZ - D
    BIT 3 - .1 MHZ - E
    BIT 4 - 1 MHZ - A
    BIT 5 - 1 MHZ - C
    BIT 6 - 1 MHZ - D
    BIT 7 - 1 MHZ - E

THE HI2X5 PORT HAS INPUTS ONLY TO THE BOTTOM FOUR BITS. THIS PORT IS CONNECTED
TO THE 10 MHZ AND .05 MHZ PARALLEL TUNING INPUTS (BITS 1 AND 0 RESPECTIVELY), TO
THE HOLD INPUT (BIT 2), AND TO THE TEST INPUT (BIT 3). THIS PORT IS ADDRESSED
AS I/O PORT 10 HEX.

3.5  OUTPUT PORTS

FOUR OUTPUT PORTS ARE ADDRESSABLE BY THE PROCESSOR.

THE TRANSMIT PORT IS MAPPED AS MEMORY ADDRESS 6XXX HEX. OUTPUTS ON THIS PORT
ARE:
    BIT 0 - P1/P2 LOGIC DRIVE TO MODULATOR
    BIT 1 - SUPPRESSION FRAME
    BIT 2 - VIDEO TEST OUTPUT
    BIT 3 - TEST B OUTPUT
    BIT 4 - TEST A OUTPUT
    BIT 5 - X/Y MODE
    BIT 6,7 - NOT USED

THE AUDIO / SERIAL DATA PORT IS MAPPED AS MEMORY LOCATION 5XXX HEX. OUTPUTS ON
THIS PORT ARE:
    BIT 0 - AUDIO # 1 ENABLE
    BIT 1 - AUDIO # 2 ENABLE
    BIT 2 - AUDIO # 3 ENABLE
    BIT 3,4 - NOT USED
    BIT 5 - SMO DATA SYNC PULSE
    BIT 6 - SMO DATA CLOCK
    BIT 7 - SMO DATA DATA

THE ANALOG CONDITION PORT IS MAPPED AS I/O PORT 1. OUTPUTS ON THIS PORT ARE:
- BIT 0,1 - RESERVED
- BIT 2 - ANALOG FLAG
- BIT 3 - 6-WIRE DATA ENABLE
- BIT 4 - LOAD AGC OR AVG. VIDEO VALUE CAPACITOR (1=LOAD)
- BIT 5 - AGC/AVG. VALUE CAPACITOR SELECT (0=AGC CAP.)
- BIT 6 - ENABLE RECEIVER TUNE OUTPUT
- BIT 7 - NOT USED

THE SIX WIRE DATA PORT IS MAPPED AS I/O PORT 2. BITS 0 AND 7 OF THIS PORT ARE INPUTS TO 64 BIT SHIFT REGISTERS OPERATED OFF A COMMON CLOCK. THIS PORT IS USED TO LOAD THE DATA REQUIRED FOR THE SIX-WIRE DATA AND SYNCHRONIZATION OUTPUT.

3.6 HEART BEAT MONITOR

A HEARTBEAT MONITOR CIRCUIT IS CONNECTED TO THE "SOD" OUTPUT AND THE RESET INPUT OF THE PROCESSOR. IN THE EVENT THAT A LOW TO HIGH TRANSITION DOES NOT OCCUR ON THE "SOD" OUTPUT AT LEAST EVERY 20 MILLISECONDS, A LOGIC "0" WILL BE APPLIED TO THE PROCESSOR RESET PIN.

4.0 INITIAL CONDITION SOFTWARE

UPON INITIAL APPLICATION OF POWER OR WHENEVER THE HEARTBEAT MONITOR SHALL HAVE DETECTED A LOSS OF PROGRAM EXECUTION, THE FOLLOWING ACTIONS SHALL BE TAKEN:

1. PERFORM MODULO 256 CHECKSUM AND FLAG DIAGNOSTIC REGISTER (BIT 6) IF SUM IS OTHER THAN 0.

2. WRITE PATTERN OF "1'S" AND "0'S" INTO RAM LOCATIONS AND VERIFY CORRECT OPERATION. SET BIT 7 IN THE DIAGNOSTIC REGISTER IF INCORRECT DATA IS READ.

3. PROVIDE SOFTWARE RESET OF THE UART AND INITIALIZE FOR PROPER ASYNCHRONOUS MODE OPERATION. (/16, ODD PARITY, SINGLE STOP BIT, 8 BIT BYTE)

4. INITIALIZE ALL RAM LOCATIONS TO 0 WITH THE FOLLOWING EXCEPTIONS. THE AGC REGISTER FOR EACH CHANNEL SHALL BE SET AT 3.0 VOLTS(C0 HEX), THE CURRENT IDENT CHARACTERS SHALL BE SET TO A VALUE GREATER THAN 80 HEX, FF HEX SHALL BE STORED AT THE TOP OF THE DISTANCE ACQUISITION LIST, AND THE PRESENT IDENT CHARACTER REGISTER FOR EACH CHANNEL SHALL BE SET TO "1".

5. ENABLE INTERRUPTS , START THE TIMER, AND CALL THE BACKGROUND PROGRAM.

5.0 FREQUENCY CONTROL

5.1 FREQUENCY INPUT

THE PROCESSOR SHALL ACCEPT EITHER OF TWO TYPES OF FREQUENCY INPUTS. IF THE INPUT FROM THE "2X5/SERIAL" INPUT, J1-48 IS A LOGIC "1", THE PROCESSOR SHALL READ THE 2X5 PARALLEL INPUTS TO DETERMINE THE NAV FREQUENCY WITH WHICH THE DME IS TO BE PAIRED. IF THE "2X5/SERIAL" INPUT IS A "0", THE PROCESSOR SHALL USE THE SERIAL DATA TO DETERMINE THE FREQUENCY INPUT. IF THE 2X5 MODE HAS BEEN SELECTED ONLY ONE FREQUENCY INPUT IS ALLOWED. IF THE SERIAL MODE HAS BEEN SELECTED, UP TO THREE FREQUENCIES CAN BE SELECTED. THE FREQUENCY(S) WHICH THE PROCESSOR HAS ACCEPTED WILL BE OUTPUT ON THE SERIAL DATA BUS IN ACCORDANCE WITH THE FORMAT SHOWN IN APPENDIX A.

5.1.1 2X5 INPUTS

FOR 2X5 TUNING INPUTS, THE RELATIONSHIP BETWEEN INPUTS AND DESIRED FREQUENCY FOR THE .1 AND 1 MHZ DIGITS IS AS FOLLOWS:

| A | C | D | E | DIGIT |
|---|---|---|---|-------|
| 1 | 1 | 1 | 0 | 0 |
| 0 | 1 | 1 | 1 | 1 |
| 0 | 0 | 1 | 1 | 2 |

|   |   |   |   |   |
|---|---|---|---|---|
| 1 | 0 | 1 | 1 | 3 |
| 1 | 1 | 0 | 1 | 4 |
| 1 | 0 | 0 | 1 | 5 |
| 1 | 0 | 1 | 0 | 6 |
| 1 | 1 | 0 | 0 | 7 |
| 0 | 1 | 0 | 1 | 8 |
| 0 | 1 | 1 | 0 | 9 |

IF THE .01 MHZ (C) INPUT IS "0" THE .01 MHZ DIGIT SHALL BE 5, OTHERWISE IT SHALL BE 0.

IF THE 10 MHZ (A) BIT IS "1", THE 10 MHZ DIGIT SHALL BE 1. IF THE 10 MHZ (A) INPUT IS "0" THE 10 MHZ DIGIT SHALL BE 0 IF THE 1 MHZ DIGIT IS 8 OR 9, 3 IF THE 1MHZ BIT IS 3,4, OR 5, AND "DON'T CARE" IF THE 1MHZ DIGIT IS ANY OTHER VALUE. FOR ALL FREQUENCIES THE 100 MHZ BIT SHALL BE 1.

IN THE EVENT ALL THE 2X5 DATA LINES ARE "1'S" OR THE HOLD INPUT (PIN J1-42) IS A "1", THE LAST FREQUENCY TO HAVE BEEN ACCEPTED SHALL BE USED AS THE ACTIVE FREQUENCY, AND THE HOLD BIT SHALL BE SET IN THE SERIAL DATA OUTPUT.

5.1.2 SERIAL FREQUENCY

IN THE SERIAL FREQUENCY MODE THE PROCESSOR SHALL USE THE DATA PRESENT ON THE SERIAL BUS TO CALCULATE THE VHF FREQUENCY WITH WHICH THE DME IS TO BE PAIRED. THE .01,.1,1, AND 10 MHZ BITS SHALL BE DERIVED FROM THE SECOND AND THIRD BYTE OF THE DME FREQUENCY DATA GROUP (SEE APP. A) WHILE THE 100 MHZ BIT SHALL BE IMPLIED AS 1. IN THE SERIAL MODE THE PROCESSOR SHALL RECOGNIZE THE TEST AND HOLD BITS IN THE STATUS BYTE, SHALL ECHO THESE BITS IN THE SERIAL DATA OUTPUT AND SHALL COMMENCE SELF TEST IF SELF TEST BIT IS SET.

THE PROCESSOR SHALL PRACTICE LABEL AND VALIDITY BIT RECOGNITION SUCH THAT ONLY DATA GROUPS WITH LABEL 24 HEX AND FREQUENCY VALIDITY BIT SET TO 1 ARE ACCEPTED. ALSO, THE PROCESSOR SHALL USE THE SOURCE IDENTIFIER BITS, BIT 0 AND 1 OF THE STATUS BYTE (REFER TO APP. A) TO DETERMINE WHICH GROUP IS TO CONTROL EACH OF THE CHANNELS. SINCE THERE ARE FOUR POSSIBLE SOURCE IDENTIFIERS AND ONLY THREE DME CHANNELS AVAILABLE, THE POSSIBLE COMBINATIONS OF SOURCE IDENTIFIER AND CHANNEL NUMBER ARE AS FOLLOWS:

| CHANNEL | SI | SI | SI | SI |
|---|---|---|---|---|
| 1 | 01 | 11 | 01 | 01 |
| 2 | 10 | 10 | 11 | 10 |
| 3 | 00 | 00 | 00 | 11 |

5.3 SMO TUNING

THE PROCESSOR SHALL CONVERT THE ACCEPTED NAV FREQUENCY TO THE APPROPRIATE DME FREQUENCY ACCORDING TO THE FOLLOWING ALGORITHM:

IF THE NAV FREQUENCY (IGNORING THE .01 MHZ DIGIT) IS BETWEEN 108.0 AND 112.2 THE DME FREQUENCY SHALL BE F*10-39 (F IS FREQUENCY IN MHZ).

IF THE NAV FREQUENCY IS BETWEEN 112.3 AND 117.9 THE DME FREQUENCY SHALL BE F*10-29

IF THE VHF FREQUENCY IS A COMM FREQUENCY BETWEEN 133.3 AND 134.2 THE DME FREQUENCY SHALL BE F*10-249.

IF THE VHF FREQUENCY IS A COMM FREQUENCY BETWEEN 134.4 AND 135.9 THE DME FREQUENCY SHALL BE F*10-319.

ALL OTHER FREQUENCIES SHALL BE RECOGNIZED AS NOT VALID FREQUENCIES AND WILL LEAVE THE SMO TUNED TO THE LAST FREQUENCY ACCEPTED.

THE PROCESSOR SHALL CONVERT THE DME FREQUENCY DATA TO A 19 BIT SERIAL WORD FOR USE BY THE SMO FREQUENCY SYNTHESIZER I.C. THE FORMAT OF THE WORD IS "00" FOLLOWED BY A 10 BIT "N" WORD FOLLOWED BY A 7 BIT "A" WORD. THE "N" WORD IS THE BINARY NUMBER RESULTING FROM THE FOLLOWING EQUATION:

N= INT(FREQ./40)*2
THE "A" WORD IS THE BINARY NUMBER RESULTING FROM THE FOLLOWING EQUATION:
A= FREQ. - 20*N
CLOCK DATA RATE SHALL BE APPROXIMATELY 50 KHZ.. A POSITIVE GOING PULSE ON THE SYNC OUTPUT AT THE CONCLUSION OF THE SERIAL WORD SHALL SIGNAL COMPLETION OF THE TRANSMISSION.

5.4 RECEIVER TUNING

THE PROCESSOR SHALL CALCULATE A VOLTAGE WHICH THE RECEIVER CAN UTILIZE TO TUNE THE PRE-SELECTOR TO A BAND CENTERED ON THE DESIRED GROUND STATION FREQUENCY. TO OUTPUT THE TUNE VOLTAGE, THE PROCESSOR MUST SELECT PROPER SWITCH ARRANGEMENT TO DIRECT THE D/A CONVERTER OUTPUT TO THE APPROPRIATE AMPLIFIER AND MUST SET UP THE APPROPRIATE VALUE FOR THE DESIRED FREQUENCY. SINCE THE OUTPUT AMPLIFIER HAS POTENTIOMETERS FOR GAIN AND OFFSET ADJUSTMENTS, THE PROCESSOR NEED ONLY ESTABLISH NOMINAL VOLTAGE VALUES ALLOWING TAILORING TO THE INDIVIDUAL RECEIVER VIA THE EXTERNAL ADJUSTMENTS.

THE RECEIVE FREQUENCY WILL ALWAYS BE EITHER 63 MHZ. ABOVE THE TRANSMIT FREQUENCY OR 63 MHZ. BELOW THE TRANSMIT FREQUENCY. THEREFORE IN ORDER TO SET UP THE APPROPRIATE TUNING VOLTAGE, THE PROCESSOR MUST FIRST HAVE CALCULATED THE TRANSMIT FREQUENCY (SEE PARA. 5.3) AND THEN DETERMINE WHETHER THE DESIRED RECEIVE FREQUENCY IS LOWER OR HIGHER ACCORDING TO THE FOLLOWING CRITERIA:

IF THE TRANSMIT FREQUENCY IS BETWEEN 1025 AND 1087 MHZ AND THE .01 MHZ DIGIT OF THE VHF FREQUENCY IS 0 (X MODE) OR IF THE TRANSMIT FREQUENCY IS BETWEEN 1088 AND 1150 MHZ. AND THE .01 MHZ DIGIT OF THE VHF FREQUENCY IS 5 (Y MODE) THE RECEIVE FREQUENCY IS 63 MHZ. LOWER THAN THE TRANSMIT FREQUENCY.

FOR FREQUENCIES FROM 1025 TO 1087 MHZ. AND Y MODE OR 1088 TO 1150 AND X MODE THE RECEIVE FREQUENCY SHALL BE 63 MHZ. GREATER THAN THE TRANSMIT FREQUENCY

THE TUNING CURVE REQUIRED TO PROVIDE THE PROPER EXCITATION TO THE RECEIVER IS AS FOLLOWS:

| FREQUENCY | OUTPUT |
|---|---|
| 960 | 00 |
| 992 | 18 |
| 1024 | 39 |
| 1056 | 64 |
| 1088 | 90 |
| 1120 | 125 |
| 1152 | 162 |
| 1184 | 207 |
| 1216 | 255 |

5.5 X/Y MODE SELECTION

IF THE VHF FREQUENCY .01 MHZ DIGIT IS 0, THE FREQUENCY SELECTED IS AN "X MODE" FREQUENCY AND THE OUTPUT OF THE X/Y MODE LINE (BIT 5 OF THE TRANSMIT PORT) SHALL BE SET TO A LOGIC "1".

IF THE VHF FREQUENCY .01 MHZ DIGIT IS 5, THE FREQUENCY SELECTED IS A "Y MODE FREQUENCY AND THE X/Y MODE LINE SHALL BE SET TO 0.

6.0 MULTI-CHANNEL OPERATION

THE PROCESSOR CONTROLS THE MULTI-CHANNEL OPERATION OF THE DME, ORCHESTRATING THE ACTIVITIES OF THE SMO, RECEIVER, TRANSMITTER, VIDEO DECODER, TIMER, AND SWITCHING CIRCUITRY TO PROVIDE RANGING CALCULATIONS AND IDENTITY DETERMINATION OF UP TO THREE GROUND STATIONS SIMULTANEOUSLY. MOVEMENT BETWEEN THE THREE FREQUENCIES OCCURS AT A RATE OF APPROXIMATELY 81 HZ., ALLOWING EACH STATION TO BE SAMPLED 27 TIMES PER SECOND. FOLLOWING IS A LIST OF THE ACTIVITIES EXTERNAL TO THE PROCESSOR THAT MUST BE PERFORMED AS THE STATIONS ARE SCANNED:

1. READ AND STORE THE VOLTAGE VALUES PRESENT ON THE AGC AND AVG. VIDEO VALUE CAPACITORS.(THIS DATA IS FROM THE PREVIOUSLY SCANNED CHANNEL)

2. OUTPUT THE NEW AGC AND AVG. VIDEO VALUES.

3. SEND NEW TRANSMIT FREQUENCY TO SMO.

4. SET X/Y MODE FOR USE BY VIDEO DECODER.

5. SET NEW RECEIVER TUNE VOLTAGE.

6. AFTER ALLOWING A MINIMUM OF THREE MILLISECONDS FOR THE SMO TO RESPOND TO THE FREQUENCY CHANGE, OUTPUT SUPPRESSION AND PULSE PAIR (IF SO DETERMINED BY RANGING ALGORITHM) SIGNALS ON THE TRANSMIT PORT. THE PULSE PAIR WILL BE TWO POSITIVE GOING PULSES OF 7.6 MICROSECOND DURATION SPACED 12 (X MODE) OR 36 (Y MODE) MICROSECONDS APART. THE SUPPRESSION PULSE SHALL BRACKET THE PULSE PAIR, PRECEEDING THE FIRST PULSE BY 4 MICROSECONDS AND FOLLOWING THE CONCLUSION OF THE SECOND PULSE BY 2 MICROSECONDS.

7. ENABLE THE VIDEO INTERRUPT TO ALLOW THE PROCESSOR TO RECORD THE TIMES AT WHICH DECODED PULSE PAIRS ARE RECEIVED BY THE VIDEO DECODER. THE VIDEO INTERRUPTS SHALL BE RECORDED FOR A PERIOD OF 5.5 MILLISECONDS TO INSURE SUFFICIENT SAMPLES TO DETECT IDENTITY PERIODS.

8. REPEAT 1 THROUGH 7 FOR NEXT CHANNEL.

7.0 RANGING ALGORITHMS

THE PROCESSOR SHALL PROGRESS THROUGH FOUR MODES OF OPERATION TO DETERMINE THE RANGE AND VELOCITY TO/FROM THE STATION BEING MONITORED. THESE FOUR MODES OF OPERATION ARE OUTLINED IN THE FOLLOWING PARAGRAPHS:

7.1 NO SIGNAL PRESENT

UPON INITIALIZATION AND DURING ANY PERIOD OF TIME WHEN A SEARCH, TRACK, OR PRETRACK MODE DETERMINATION HAS NOT BEEN MADE, THE UNIT SHALL BE IN THE "NO SIGNAL" MODE. DURING THIS MODE THE AVG. VALUE VIDEO VOLTAGE SHALL BE MONITORED TO DETERMINE IF DECODED PULSE PAIRS FROM A GROUND STATION ARE PRESENT. IF THE VOLTAGE VALUE IS GREATER THAN 1.5 VOLTS, THE SIGNAL PRESENT IS MOSTLY NOISE AND A "NO SIGNAL PRESENT" DETERMINATION SHALL BE MADE. IF THE VOLTAGE IS LESS THAN 1.5 VOLTS BUT GREATER THAN .5 VOLTS, SIGNAL SHALL BE ASSUMED TO BE PRESENT AND THE "SEARCH" MODE SHALL BE ENTERED. EVERY FIVE SECONDS THE AVG. VALUE VOLTAGE WILL BE TESTED FOR HAVING A VALUE LESS THAN .5 VOLTS. THE AGC VOLTAGE WILL BE SET TO 2.5 VOLTS IF SUCH A CONDITION IS DETECTED. (THIS MIGHT BE THE CONDITION IF THE RECEIVER HAD BECOME SATURATED AND COULD NO LONGER DISTINGUISH PULSE PAIRS)

DURING THE PERIOD THAT THE UNIT IS IN THE NO SIGNAL MODE, THE DISTANCE VALIDITY BIT SHALL BE "0". AND BITS 5 AND 4 OF THE DISTANCE WORD STATUS BYTE SHALL BE "00"

7.2 SEARCH MODE

ONCE SIGNAL PRESENCE HAS BEEN DETECTED, THE "SEARCH" MODE SHALL BE ENTERED. DURING THIS PERIOD OF TIME, THE TRANSMITTER WILL BE PULSED EACH SAMPLE PERIOD (27 TIMES PER SECOND). AT THE CONCLUSION OF EACH SAMPLE PERIOD, THE NEW DISTANCE LIST COMPOSED OF ALL THE TIMES THAT DETECTED VIDEO OCCURRED RELATIVE TO THE TRANSMITTED PULSES SHALL BE COMPARED AGAINST THOSE THAT OCCURED DURING THE PREVIOUS SAMPLE OF THAT CHANNEL. IF TWO DISTANCES THAT COMPARE WITHIN .23 NAUTICAL MILES ARE FOUND, THE UNIT SHALL PROCEED TO THE "PRETRACK MODE". IF NO COMPARES ARE FOUND WITHIN 5 SECONDS, REVERSION TO THE "NO SIGNAL PRESENT" MODE SHALL OCCUR.

BETWEEN SUCCESSIVE TRANSMIT INTERROGATIONS, THE SOFTWARE SHALL PROVIDE A PSUEDO-RANDOM DELAY OF APPROXIMATELY 0-.15 MILLISEC. TO INSURE THAT

TRANSMISSIONS DO NOT BECOME LOCKED WITH THOSE OF ANOTHER NEARBY AIRBORNE DME.
(APPLIES ALSO TO PRE-TRACK AND TRACK MODE INTERROGATIONS.)

WHILE IN THE SEARCH MODE THE DISTANCE VALIDITY BIT WILL ALWAYS BE SET TO A 0.
BITS 5 AND 4 OF THE DISTANCE WORD STATUS BYTE SHALL BE SET TO "01.

7.3 PRETRACK MODE

IN THE PRETRACK MODE, THE PROCESSOR SHALL REDUCE THE INTERROGATION RATE TO 1/4
THE SAMPLE RATE. FOR EACH INTERROGATION THE PRESENT VIDEO DISTANCE LIST WILL BE
COMPARED WITH THE VALUE WHICH WAS DERIVED DURING THE "SEARCH" MODE. IF ONE OF
THE VALUES IN THE LIST IS WITHIN .4 MILES OF THIS VALUE, A "HIT" WILL BE
RECORDED, IF NOT A "MISS" WILL BE RECORDED. IF THE NUMBER OF HITS IS THREE
GREATER THAN THE NUMBER OF MISSES, THE "TRACK" MODE WILL BE ENTERED. IF THE
NUMBER OF MISSES EXCEEDS THE NUMBER OF HITS BY FIVE, REVERSION TO THE "SEARCH"
MODE SHALL OCCUR.

UPON ATTAINMENT OF EITHER THE PRE-TRACK OR TRACK MODES, A TYPE 2 SERVO LOOP
SHALL BE ESTABLISHED TO CONTINUALLY CORRECT THE LOOP FOR DISTANCE CHANGES (i.e.-
VELOCITY). EACH SAMPLE PERIOD A VALUE REPRESENTATIVE OF THE CALCULATED VELOCITY
OF THE SYSTEM SHALL BE ADDED TO THE DISTANCE REGISTER.

THE DIFFERENCE BETWEEN THE VALUE OF DISTANCE STORED IN THE DISTANCE REGISTER AND
THE VALUE IN THE CURRENT DISTANCE LIST SHALL BE USED TO UPDATE THE DISTANCE
REGISTER AND TO UPDATE THE VELOCITY REGISTER. THE VALUE ADDED TO THE DISTANCE
REGISTER SHALL BE THE ACTUAL ERROR DIVIDED BY 32. THE VALUE ADDED TO THE
VELOCITY REGISTER SHALL BE A FUNCTION OF THE ERROR SIZE AND THE SIZE OF THE
AVERAGE ERROR OCCURRING DURING PAST INTERROGATIONS WHICH ELICITED A REPLY. FOUR
DIFFERENT VALUES OF VELOCITY TIME CONSTANT ARE USED AS A FUNCTION OF THE SIZE OF
THE AVERAGE ERROR. THE RELATIONSHIP BETWEEN THE VALUE OF THE VELOCITY TIME
CONSTANTS AND THE DIFFERENCE BETWEEN ACTUAL AND STORED VELOCITY VALUE SHALL BE
AS FOLLOWS:

| TIME CONST. | VEL. ERROR | AVG. DIST. ERROR | DIVISOR | LIMIT |
|---|---|---|---|---|
| 5 SEC. | > 47 KT. | >.08 NMI | 2 | 15 |
| 12 SEC. | 24-47 KT. | .04-.08 | 4 | 7 |
| 24 SEC. | 12-23 KT. | .02-.04 | 8 | 3 |
| 48 SEC. | < 12 KT. | <.02 | 16 | 1 |

THE DIVISOR IN THE ABOVE TABLE IS THE VALUE BY WHICH THE DISTANCE ERROR IS
DIVIDED BEFORE BEING ADDED TO THE VELOCITY REGISTER. THE AVERAGE ERROR IS THE
VALUE WHICH IS USED TO DETERMINE WHEN TO SWITCH TO THE NEXT DIVIDE RATIO, WHILE
THE VELOCITY ERROR IS THE APPROXIMATE VELOCITY ERROR EQUIVALENT TO THE DISTANCE
ERROR ASSUMING NO ACCELERATION. THE TIME CONSTANT IS THE APPROXIMATE TIME
CONSTANT RESULTING FROM THE LISTED DIVIDE RATIO. THE LIMIT IS APPLIED TO THE
DISTANCE ERROR BEFORE BEING ADDED TO EITHER THE DISTANCE OR VELOCITY. THE LIMIT
NUMBER LISTED IS THE NUMBER OF .0167 NMI BITS.

WHILE IN THE PRETRACK MODE, THE DISTANCE IN THE DISTANCE REGISTER WILL BE PLACED
ON THE DATA BUS. HOWEVER, THE DISTANCE VALIDITY BIT WILL BE SET TO A 0. THE
PRETRACK CONDITION SHALL BE ANNUNCIATED BY SETTING BITS 5 AND 4 OF THE DISTANCE
WORD STATUS BYTE TO "10"

7.4 TRACK MODE

IN THE TRACK MODE THE UNIT WILL CONTINUE TO DO THE RANGING CALCULATIONS IN THE
SAME MANNER AS DESCRIBED FOR THE PRETRACK MODE. HOWEVER, THE HIT/MISS COUNTING
TO DETERMINE WHEN TO GO INTO THE TRACK MODE WILL BE DISCONTINUED. IN ITS PLACE,
A MEMORY TIMER SHALL BE INITIALIZED FOR A STARTING VALUE OF 10 SECONDS. THIS
COUNTER SHALL BE RESET TO 10 SECONDS WHENEVER THE NUMBER OF "HITS" IS GREATER
THAN 1/2 THE NUMBER OF "MISSES". IF THE TIMER SHOULD NOT BE RESET BEFORE THE
TIMER UNDER FLOWS, REVERSION TO THE "NO SIGNAL" MODE SHALL OCCUR.

IN THE TRACK MODE THE DISTANCE VALIDITY BIT SHALL BE SET TO A "1" AND THE

SEARCH/TRACK BITS IN THE DISTANCE WORD'S STATUS BYTE (BITS 5 AND 4) SHALL BE
"11".

7.5 ECHO MONITOR

IN BOTH THE TRACK AND PRE-TRACK MODES, THE PROCESSOR SHALL BE PROVIDING A SECOND
RANGING SEARCH LOOKING FOR DISTANCES WHICH ARE NEARER TO THE UNIT THAN THE ONE
PRESENTLY BEING USED IN THE DISTANCE CALCULATIONS. THE SAME CRITERIA AS
DESCRIBED FOR THE SEARCH AND PRE-TRACK MODES SHALL BE USED TO DETERMINE WHEN
SUCH A SIGNAL IS PRESENT. PRESENCE OF A CLOSER SIGNAL SHALL CAUSE THE PRIMARY
SEARCH/TRACK LOOP TO REVERT TO THE "NO SIGNAL" CONDITION AND AGAIN PROGRESS
THROUGH THE SEARCH/TRACK MODES.

8.0 IDENTITY DETECTION AND DECODING 8.1 IDENTITY DETECTION

THE PROCESSOR SHALL USE THE DISTANCE ACQUISITION LIST WHICH IS GATHERED AS A
PART OF THE SEARCH/TRACK - RANGING ALGORITHMS IN ORDER TO DETERMINE WHEN AN
IDENTITY PERIOD IS OCCURRING. THIS LIST WHICH SHOWS THE TIMES AT WHICH GROUND
STATION REPLIES OCCURRED SHALL BE SEARCHED FOR SPACING INTERVALS OF 740 +/- 50
MICROSECONDS, 1480 +/- 150 MICROSECONDS, OR LESS THAN 125 MICROSECONDS. IF ADJACENT
TIMES IN THE LIST HAVE 740 USEC. SPACINGS, A "HIT" SHALL BE RECORDED. IF
ADJACENT TIMES IN THE LIST HAVE 100 USEC. SPACINGS, THE INTERVAL TO THE NEXT
LISTING SHALL BE ADDED TO THE PREVIOUS INTERVAL AND A "HIT" RECORDED IF THE
INTERVAL IS 740 USEC. IF THE TIME INTERVAL BETWEEN EVERY SECOND PULSE IS 1480 OR
740 USEC. A "HIT" SHALL BE RECORDED.

ONCE THE ENTIRE LIST HAS BEEN SEARCHED AND THE NUMBER OF "HITS" RECORDED, THE
PRESENCE OR ABSENCE OF IDENTITY INFORMATION SHALL BE DETERMINED AS FOLLOWS:

IF THE TOTAL NUMBER OF "HITS" IN THE CURRENT LIST AND THE PREVIOUS LIST IS
   10 OR MORE AN AUDIO TONE SHALL BE GATED BY SETTING THE APPROPRIATE BIT IN
   THE AUDIO/SERIAL DATA PORT. OTHERWISE THE AUDIO BIT SHALL BE RESET.

IF THE TOTAL NUMBER OF "HITS" IN THE CURRENT LIST AND THE PREVIOUS LIST IS 10 OR MORE, THIS PERIOD
   SHALL BE CONSIDERED TO BE PART OF AN IDENTITY PERIOD. IF THE NUMBER OF
   "HITS" IS LESS THAN 10 IT SHALL BE CONSIDERED A NON-IDENT PERIOD. THIS
   INFORMATION SHALL BE PASSED TO THE IDENTITY DECODING SOFTWARE MODULE.

8.2 IDENTITY DECODING
THE PATTERN OF DOTS AND DASHES EXISTING IN THE AUDIO IDENTIFIER SHALL BE DECODED
TO DETERMINE THE MORSE CODE CHARACTERS UTILIZING THE INFORMATION PASSED FROM THE
IDENTITY DETECTION SOFTWARE MODULE. FOLLOWING IS A DESCRIPTION OF THE ALGORITHM
TO BE USED:

1. LACK OF IDENTITY DATA FOR A PERIOD OF TIME IN EXCESS OF ONE SECOND SHALL
   BE CONSIDERED THE CONCLUSION OF ONE CHARACTER SET.

2. SEVEN OR MORE CONSECUTIVE IDENT SAMPLE PERIODS FOLLOWING A NON-IDENT
   SAMPLE SHALL BE CONSTRUED AS A DASH. (SAMPLE PERIOD IS 37 MILLI SEC.)

3. LESS THAN SEVEN IDENTS SAMPLES FOLLOWING A NON-IDENT SAMPLE SHALL BE
   CONSTRUED AS A DOT.

4. SIX OR MORE CONSECUTIVE NON-IDENT SAMPLES FOLLOWING AN IDENT SAMPLE
   SHALL BE CONSTRUED AS THE SPACING BETWEEN CHARACTERS.

5. LESS THAN SIX CONSECUTIVE NON-IDENT SAMPLES BETWEEN IDENT PERIODS SHALL
   BE CONSTRUED AS THE SPACING BETWEEN DOTS AND DASHES.

6. THE MORSE CODE DOT/DASH PATTERNS SHALL BE CONVERTED TO THE EQUIVALENT
   ASCII CODE.

7. AT THE END OF A CHARACTER SET TRANSMISSION, THE ASCII CHARACTERS DECODED

FROM THE MOST RECENT TRANSMISSION SHALL BE COMPARED WITH THAT DECODED FROM
THE NEXT PREVIOUS TRANSMISSION. IF ALL CHARACTERS COMPARE, A VALIDITY FLAG
SHALL BE SET IN THE OUTPUT DATA TO REFLECT THAT THE IDENTITY DATA IS VALID.

8. ONCE THE IDENTITY DATA HAS BEEN FLAGGED AS VALID, THE NEW DATA SHALL BE
COMPARED WITH THE VALIDATED DATA. THE DATA SHALL REMAIN VALID AS LONG AS
AT LEAST EVERY OTHER TRANSMISSION COMPARES.

9. IF IDENTITY DATA IS ABSENT FOR A PERIOD IN EXCESS OF 90 SECONDS, THE
IDENTITY DATA VALIDITY FLAG SHALL BE RESET.

10. THE IDENTITY DATA VALIDITY BIT SHALL BE RESET WHENEVER A FREQUENCY
CHANGE TO THE CHANNEL IS MADE.

9.0 DATA OUTPUTS

THREE DATA SOURCES ARE AVAILABLE FROM THE UNIT. THESE DATA SOURCES ARE THE
COLLINS SERIAL DIGITAL BUS, THE ARINC 568 SIX WIRE DATA BUS, AND THE ANALOG
DISTANCE DATA OUTPUT.

9.1 COLLINS SERIAL DIGITAL BUS

SIX DATA ITEMS ARE PLACED ON THE COLLINS SERIAL DIGITAL BUS. THESE ARE DME
DISTANCE, GROUND SPEED, TIME TO GO, IDENTIFIER, FREQUENCY, AND DIAGNOSTIC
CONDITION. EACH OF THESE DATA ITEMS SHALL BE AVAILABLE FROM ALL THREE CHANNELS
AT ALL TIMES. IN THE EVENT THAT DATA IS NOT AVAILABLE FROM ANY GIVEN CHANNEL,
THE APPROPRIATE WORD WILL STILL BE PLACED ON THE BUS, BUT THE VALIDITY BIT FOR
THAT DATA ITEM WILL BE SET TO "0". DISTANCE AND FREQUENCY DATA SHALL BE SENT 10
+/-1 TIMES PER SECOND WHILE THE REMAINING DATA SHALL BE SENT 5 +/-1 TIMES PER
SECOND. A DETAILED DESCRIPTION OF THE COLLINS SERIAL DATA BUS AND THE SPECIFIC
FORMATS OF THE DME WORDS IS INCLUDED IN APPENDIX A.
THE PROCESSOR SHALL UTILIZE THE UART TO FORMAT AND TRANSMIT THE DATA.

.2 SIX-WIRE DATA

THE SIX WIRE DATA OUTPUT SHALL SEND DME DISTANCE INFORMATION AS DEFINED IN ARINC
CHARACTERISTIC NO. 568. PHYSICAL CHARACTERISTICS OF THIS DATA FORMAT INCLUDE
THREE TWO WIRE DATA OUTPUTS; CLOCK, SYNC, AND DATA. THE DATA OUTPUT IS A 32 BIT
NON-RETURN TO ZERO FORMAT, THE CLOCK IS CONTINUOUS AT A FREQUENCY BETWEEN 7.5
AND 14.5 KHZ, AND THE SYNC OUTPUT FRAMES THE 32 DATA BITS WITH A POSITIVE PULSE
EXCEPT FOR A 1/2 CLOCK PERIOD NEGATIVE PULSE FOLLOWING THE 8TH DATA BIT. LOGIC
LEVELS OF THESE SIGNALS ARE BETWEEN 0 AND 12 +3,-2 VOLTS. DATA UPDATE RATE IS
10 +/-1 TIMES PER SECOND.

THE HARDWARE AVAILABLE TO SEND SIX-WIRE DATA IS A DUAL 64 BIT SHIFT REGISTER.
ONE OF THESE REGISTERS IS CONNECTED TO THE DATA OUTPUT, THE OTHER REGISTER IS
CONNECTED TO THE SYNC OUTPUT. BOTH OF THESE REGISTERS ARE CLOCKED BY A COMMON
25 KHZ CLOCK WHICH IS DIVIDED BY TWO AND PROVIDED AS THE SIX-WIRE DATA CLOCK
OUTPUT. SWITCHING LOGIC IS PROVIDED TO ALLOW EITHER THE 25 KHZ CLOCK OR THE
SIX-WIRE PORT ADDRESS (I/O PORT 2) TO CLOCK THE REGISTERS WHILE BIT 0 CONTROLS
THE INPUT TO THE DATA REGISTER AND BIT 7 CONTROLS THE INPUT TO THE SYNC
REGISTER.

DATA MAY BE INPUT TO THE REGISTERS WHEN BIT 3 (6-WIRE OUTPUT ENABLE) OF THE
ANALOG CONDITION PORT IS A LOGIC "1". AFTER ENABLING, EACH SUCCESSIVE WRITE TO
PORT 2 CLOCKS THE DATA IN BITS 0 AND 7 INTO THE SHIFT REGISTERS. AT THE
CONCLUSION OF ENTERING THE 64 BITS, THE DATA IS TRANSMITTED BY SETTING THE
6-WIRE OUTPUT ENABLE BIT TO "0".

THE DATA LOADED INTO THE SYNC REGISTER SHALL CONSIST OF 15 "1"'S FOLLOWED BY A
SINGLE "0" FOLLOWED BY AN ADDITIONAL 48 "1"'S. THE DATA LOADED INTO THE DATA
REGISTER SHALL BE TWO BITS FOR EACH DESIRED BIT IN THE OUTPUT WORD. FORMAT OF
THE WORD IS AS FOLLOWS:

```
BITS 1-8    LABEL - 81 HEX
BITS 9-12   PAD (0'S)
```

```
BITS 13-16  .01 NMILE DIGIT (BCD)
BITS 17-20  .1  NMILE DIGIT (BCD)
BITS 21-24  1   NMILE DIGIT (BCD)
BITS 25-28  10  NMILE DIGIT (BCD)
BITS 29,30  100 NMILE DIGIT (BCD)
BITS 31,32  00=VALID DATA
            01=NO COMPUTED DATA
            10=TEST DATA
```

(FOR BCD DATA, LEAST SIG. DATA IS TRANSMITTED FIRST)

THE DISTANCE DATA OUTPUT ON THE SIX-WIRE BUS SHALL BE EITHER THE DATA FROM CHANNEL 1 OR CHANNEL 2. CHANNEL 1 DATA SHALL BE OUTPUT IF THE INPUT ON J1-9 (BIT 7 OF THE MONITOR PORT) IS A LOGIC "1". OTHERWISE THE DATA SHALL BE THAT OF CHANNEL 2. THE RANGE DATA SHALL BE THAT AVAILABLE FROM THE DISTANCE REGISTER CONVERTED TO .01 NAUTICAL MILE AND TO BCD FORMAT. BIT 6 OF THE STATUS BYTE OF THE SERIAL DATA IDENTITY GROUP CORRESPONDING TO THE CHANNEL WHICH IS SELECTED FOR SIX-WIRE DATA OUTPUT SHALL BE SET TO A "1".

IF THE DATA IN THE DISTANCE REGISTER IS IN EXCESS OF 256 NMILES, THE DISTANCE SHALL BE SET TO 0 AND BITS 31 AND 32 SHALL REFLECT "NO COMPUTED DATA". IF THE UNIT IS IN THE SELF TEST MODE, 100 MILES SHALL BE SUBTRACTED FROM THE DATA PRESENT IN THE DISTANCE REGISTER. IF VALID DISTANCE DATA IS AVAILABLE AND THE UNIT IS IN SELF TEST, BITS 31 AND 32 SHALL BE SET TO THE "TEST DATA" CONDITION. IF DATA IS VALID AND NONE OF THE OTHER ABOVE CONDITIONS EXIST, THE "VALID DATA" CONDITION SHALL BE SET IN BITS 31 AND 32.

9.3  ANALOG DISTANCE

THE RANGE INFORMATION CONTAINED IN THE DISTANCE REGISTER SHALL BE CONVERTED TO A 12 BIT BINARY NUMBER WHOSE LEAST SIGNIFICANT BIT IS EQUAL TO .0625 NAUTICAL MILE. THIS NUMBER SHALL BE WRITTEN TO THE 12 BIT DAC DESCRIBED IN PARA. 3.3. DATA OUTPUT SHALL REFLECT THAT PROVIDED ON THE SIX-WIRE OUTPUT.

A DME FLAG OUTPUT (PIN J1-10 - BIT 2 OF THE ANALOG CONDITION PORT) SHALL BE SET TO A LOGIC "1" WHENEVER THE DATA BEING PROVIDED IS VALID AND A LOGIC "0" WHEN NOT VALID.

10.0  SELF TEST AND DIAGNOSTICS

10.1  MONITORS

THREE MONITORS; POWER SUPPLY, SMO LOCK, AND TRANSMIT POWER (AVAILABLE ON BITS 0,1,2 OF MONITOR PORT) ARE CONTINUOUSLY AVAILABLE FOR TESTING AND REFLECTION IN THE DIAGNOSTIC DATA OF THE SERIAL DATA BUS. IN ADDITION, THE STATUS OF THE RAM AND ROM TESTS PERFORMED DURING INITIALIZATION SHALL BE CONTINUOUSLY AVAILABLE IN THE DIAGNOSTIC WORD. THE STATE OF THE TRANSMITTER POWER MONITOR SHALL ONLY BE TESTED FOLLOWING TRANSMISSION OF A PULSE PAIR, AND THE STATE OF THE SMO LOCK DETECTOR SHALL NOT BE TESTED WITHIN 3 MILLISECONDS OF SENDING A NEW FREQUENCY TO THE SMO. (SEE APP. A FOR FORMAT DETAILS)

10.2  SELF TEST

WHEN COMMANDED BY EITHER THE TEST BIT IN THE SERIAL DATA INPUT OR BY THE DISCRETE TEST INPUT (J1-26 - BIT 3 OF HI 2X5 PORT), AN APPROXIMATE 10 SECOND SELF TEST SEQUENCE SHALL BE INITIATED. THIS TEST MUST VERIFY OPERATION OF THE RECEIVER, TRANSMITTER, VIDEO DECODER, SMO, POWER SUPPLY, AND INTERNAL SOFTWARE MODULES IN ORDER TO GIVE THE DME A CLEAN BILL OF HEALTH. IF ANY OF THE MONITORS OR TESTS FAIL, THE TEST SEQUENCE SHALL BE HALTED AT THAT POINT AND THE FAILURE TRANSMITTED IN THE DIAGNOSTIC WORD ON THE SERIAL BUS. FOLLOWING A FAILURE, THE TEST MODE BIT SHALL REMAIN SET FOR AT LEAST AN ADDITIONAL 4 SECONDS BEFORE RETURNING TO THE NORMAL OPERATING MODE.

IF THE RADIO CHECKS OUT, ALL FAIL BITS IN THE DIAGNOSTIC WORD SHALL BE RESET AND A DISTANCE OF 100 MILES, A GROUND SPEED OF 100 KNOTS, A TIME TO GO OF 60

MINUTES, AND IDENTITY DATA "AOK" SHALL BE TRANSMITTED VIA THE SERIAL DATA BUS.
IN ADDITION THE MORSE CODE IDENTIFIER FOR "AOK" SHALL BE GATED ONTO THE
APPROPRIATE AUDIO OUTPUT. DATA SHALL APPEAR FOR A MINIMUM OF 4 SECONDS.

BEFORE ENTERING SELF TEST, ALL ACTIVE DATA SHALL BE STORED. THIS DATA SHALL BE
RE-ENTERED AT THE CONCLUSION OF THE TEST MODE TO ALLOW CONTINUATION FROM THE
POINT OF INTERRUPTION.

SPECIFIC TESTS WHICH ARE TO BE PERFORMED DURING SELF TEST ARE:

1. RECEIVER TEST - ENABLE THE NOISE DIODE IN THE RECEIVER. VERIFY THAT THE
AGC INCREASES BY AT LEAST .125 VOLTS IF VIDEO IS NOT PRESENT. TEST NOT
NECESSARY IF VIDEO IS PRESENT.

2. TRANSMITTER TEST - PULSE THE TRANSMITTER AND INSURE THE POWER MONITOR
DOES NOT INDICATE A FAILURE.

3. VIDEO DECODER - SEND PULSE PAIRS TO THE VIDEO DECODER AND VERIFY THAT
VIDEO INTERRUPTS ARE SENT TO THE PROCESSOR.

4. SOFTWARE TESTS - TEST THE SOFTWARE MODULES BY "STUFFING" THE DISTANCE
LIST AND ALLOWING THE ACTUAL SOFTWARE PROVIDE THE RANGING AND IDENTITY
INFORMATION THAT IS OUTPUT DURING SELF TEST.

11.0 SPECIAL TEST INPUTS

A NUMBER OF SPECIAL INPUTS ARE AVAILABLE TO FACILITATE TESTING OF THE DME.
THESE INPUTS ARE SPECIAL COMMANDS TO THE PROCESSOR TO CHANGE SOME OF THE MODES
OF OPERATION.

TWO TEST POINTS ARE AVAILABLE TO CONTROL TRANSMITTER OPERATION. THESE TWO TEST
POINTS (TP 502 AND 503) ARE BITS 6 AND 5 RESPECTIVELY OF THE MONITOR PORTS. THE
ACTIONS TO BE
TAKEN IN RESPONSE TO THE INPUTS ON THESE PORTS ARE AS FOLLOWS:

| BIT 6 | BIT 5 | ACTION |
|---|---|---|
| 0 | 0 | TRANSMIT SINGLE PULSE |
| 0 | 1 | TRANSMIT DUAL PULSES |
| 1 | 0 | NEVER TRANSMIT |
| 1 | 1 | TRANSMIT NORMALLY |

TWO OUTPUTS ARE AVAILABLE TO ALLOW USE OF THE DME WITH ONLY DIGITAL GROUND
STATION DATA. THESE TWO PORTS (J1-49, TEST A, BIT 4 OF THE TRANSMIT PORT) AND
(J1-53, TEST B, BIT 3 OF THE TRANSMIT PORT) ARE USED TO TELL A DIGITAL SIMULATOR
WHICH OF 3 CHANNELS THE DME IS CURRENTLY ACTIVE ON. IF THE FREQUENCY OF THE
CURRENT CHANNEL IS 110.0 MHZ, BIT 3 SHALL BE A "1" AND BIT 4 A "0". IF THE
FREQUENCY OF THE ACTIVE CHANNEL IS 111.0 MHZ, BIT 3 SHALL BE A "0" AND BIT 4 A
"1". FOR ANY OTHER FREQUENCY, BOTH BITS SHALL BE "0".

APPENDIX A
DME-42 SERIAL DATA FORMATS

1.0 GENERAL DESCRIPTION

THE SERIAL DATA TRANSMITTED AND RECEIVED BY THE CONTROL IS A PART OF THE COLLINS
PRO LINE II DATA BUS STRUCTURE. THE MODE OF TRANSMISSION IS NRZ (NON-RETURN TO
ZERO) ASYNCHRONUS BROADCAST USING ONE START BIT, EIGHT DATA BITS, ODD PARITY
BIT, AND ONE STOP BIT. A LOGIC "0" STATE IS LINE (B) POSITIVE WITH RESPECT TO
LINE (A). A LOGIC "1" IS LINE (A) POSITIVE WITH RESPECT TO LINE (B). THE START
BIT IS A LOGIC "0" AND THE STOP BIT A LOGIC "1". THE DATA TRANSMISSION RATE IS
12.5 K BITS/SEC. +- 0.1% WITH A REFRESH RATE OF APPROXIMATELY 5 OR 10 PER
SECOND.

THE BUS IS ORGANIZED WITH GROUPS OF SIX DATA BYTES (EACH BYTE CONSISTING OF
START BIT, EIGHT DATA BITS, PARITY BIT, AND STOP BIT) COMPRISING A DATA BLOCK.
ONE OF THE BLOCKS TRANSMITTED ON THE BUS MUST BE A "SYNC" BLOCK WHICH IS A BLOCK
WITH THE DATA BITS IN EACH OF THE SIX BYTES SET TO "10100101" (A5 HEX). THIS
BLOCK IS TRANSMITTED AT THE SAME RATE AS THE OTHER DATA BLOCKS AND IS USED TO
PERMIT SYNCHRONIZATION OF THE DATA BLOCKS. THE COMPOSITION OF THE DATA BLOCK IS
A BYTE WIDE "LABEL" FOLLOWED BY A "STATUS" BYTE AND FOUR "MESSAGE" BYTES.
WITHIN INDIVIDUAL BYTES, THE BITS ARE TRANSMITTED WITH THE LEAST SIGNIFICANT BIT
FIRST.

2.0 DATA BLOCK FORMATS:

2.1 INPUT DATA

ONE DATA BLOCK TYPE IS UTILIZED AS INPUT BY THE DME-42. THIS BLOCK WOULD
NORMALLY BE PROVIDED BY A VHF NAV CONTROL.

THE DME CONTROL DATA WILL BE SENT CONTINUOUSLY AT A REPETITION RATE OF 10 PER
SECOND. THIS INPUT WOULD BE PROVIDED TO PINS J1-55 (B) AND J1-54 (A) OF THE
UNIT.

```
BYTE 0 -   LABEL = 24 HEX
BYTE 1 -   STATUS
           BIT 7 = FREQUENCY VALID
           BIT 6,5,4 = PAD (0)
           BIT 3 = DME HOLD (1=HOLD)
           BIT 2 = TEST (1=TEST)
           BIT 1,0 = SOURCE IDENTIFIER (00 OR 11=CHAN. 3, 01=DME 1, 10=DME 2
BYTE 2 -   BITS 7-4 = 0.1 MHZ (BCD)
           BITS 3-0 = 0.01 MHZ (BCD)
BYTE 3 -   BITS 7-4 = 10 MHZ (BCD)
           BITS 3-0 = 1 MHZ (BCD)
BYTE 4,5 -PAD
```

2.2 OUTPUT DATA

THE DME OUTPUTS FOUR DIFFERENT DATA BLOCKS. THE FOUR BLOCKS ARE DME
DISTANCE/FREQUENCY, DME VELOCITY/TIME TO GO, DME IDENTITY, AND DIAGNOSTIC. THIS
DATA IS OUTPUT CONTINUOUSLY AT AN UPDATE RATE OF 10 PER SECOND FOR THE
DISTANCE/FREQUENCY GROUP, AND FIVE TIMES PER SECOND FOR THE OTHER GROUPS.
THESE OUTPUTS ARE AVAILABLE ON TWO INDEPENDENT OUTPUTS J1-2 (B) - J1-1 (A) AND
J1-46 (B) - J1-47 (A).

2.2.1 DME DISTANCE/FREQUENCY

```
BYTE 0 -   LABEL = 25 HEX
BYTE 1 -   STATUS
           BIT 7 = FREQUENCY VALID (1=VALID)
           BIT 6 = DISTANCE VALID (1=VALID)
           BIT 5,4 = SEARCH TRACK BITS (00=NO SIGNAL, 01=SEARCH, 10=PRE-TRACK,
11=TRACK
           BIT 3 = DME HOLD (1=HOLD)
           BIT 2 = TEST (1=TEST)
           BIT 1,0 = SOURCE IDENTIFIERS (01=DME 1, 10=DME 2, 00,11=DME 3

BYTE 2 -   BITS 7-4 = 0.1 MHZ (BCD)
           BITS 3-0 = 0.01 MHZ (BCD)
BYTE 3 -   BITS 7-4 = 10 MHZ (BCD)
           BITS 3-0 = 1 MHZ (BCD)
BYTE 4,5-  DME DISTANCE (BINARY) (BIT 0 OF BYTE 4=1/128 NMI.,
           BIT 7 OF BYTE 5=256 NMI.)
```

2.2.2 VELOCITY/TIME BLOCK

```
BYTE 0-    LABEL = 26 HEX
BYTE 1-    STATUS
           BIT 7 = VALIDITY (1=VALID)
           BIT 6 = PAD
           BIT 5,4 = SEARCH/TRACK (SEE 2.2.1)
           BIT 3 = PAD
           BIT 2 = TEST (1=TEST)
           BIT 1,0 = SOURCE IDENTIFIERS (SEE 2.2.1)
BYTE 2 -   BITS 7-4 = 1 MIN.(BCD)
           BITS 3-0 = NOT USED (0)
BYTE 3 -   BITS 7-4 = 100 MIN (BCD)
           BITS 3-0 = 10 MIN. (BCD)
BYTE 4 -   BITS 7-4 = 10 KT.(BCD)0
           BITS 3-0 = 1 KT.(BCD)
BYTE 5 -   BITS 7-4   PAD
           BITS 3-0 = 100 KT.(BCD)
```

2.2.3 DME IDENTIFIER BLOCK

```
BYTE 0-    LABEL = 27 HEX
BYTE 1-    STATUS
           BIT 7 = IDENT. VALIDITY (1=VALID)
           BIT 6 = ANALG/568 DATA SELECT (1=SIDE SELECTED)
           BIT 5,4 = SEARCH/TRACK (SEE 2.2.1)
           BIT 3 = PAD
           BIT 2 = TEST (1=TEST)
           BIT 1,0 = SOURCE IDENTIFIER (SEE 2.2.1)
BYTE 2 -   FIRST CHARACTER (ASCII)
BYTE 3 -   SECOND CHARACTER (ASCII)
BYTE 4 -   THIRD CHARACTER (ASCII)
BYTE 5 -   FOURTH CHARACTER (ASCII)
           NOTE: BIT 7 IS "0" IF CHARACTER IS VALID
```

2.2.4 DIAGNOSTIC BLOCK

```
BYTE 0 -   LABEL = F3 HEX
BYTE 1 -   STATUS
           BIT 7,6 = DIAGNOSTIC CONDITION (NORMALLY 00)
           BIT 5 = PAD
           BIT 4 = FAULT DETECT (1= FAULT)
           BIT 3 = PAD
           BIT 2 = TEST (1=TEST)
           BIT 1,0 = SOURCE IDENTIFIER (SEE 2.2.1)
BYTE 2 -   DIAGNOSTIC MESSAGE BITS
           BIT 7 = ROM FAILURE
           BIT 6 = RAM FAILURE
           BIT 5 = DISTANCE PROCESSOR FAILURE
           BIT 4 = RECEIVER FAILURE
           BIT 3 = VIDEO PROCESSOR FAILURE
           BIT 2 = TRANSMITTER FAILURE
           BIT 1 = SMO FAILURE
           BIT 0 = POWER SUPPLY FAILURE
BYTE 3,4-  NOT USED
BYTE 5 -   2 DIGIT BCD FAULT CODE
           0 = NO FAILURE
           1 = POWER SUPPLY FAILURE
           2 = SMO FAILURE
           3 = TRANSMITTER FAILURE
           4 = VIDEO PROCESSOR FAILURE
           5 = RECEIVER FAILURE
           6 = DISTANCE PROCESSOR FAILURE
           7 = RAM FAILURE
           8 = ROM FAILURE
```

I claim:

1. A time-multiplexed method for decoding identity information contained in a distance measuring equipment transmitter output signal comprising the steps of:
   a. designating a plurality of cyclical discrete periods of reception for said transmitter;
   b. registering a pulse received from said distance measuring equipment transmitter and during at least one of said plurality of discrete periods of reception for said transmitter;
   c. initiating a timing sequence in response to said registering step, wherein said sequence has a specified time-out;
   d. indicating a hit in response to a second received pulse from said transmitter substantially coincident with said specified time-out, and during said at least one discrete period;
   e. counting the number of hits obtained during each discrete period, and summing said number with the number of hits counted in the immediately subsequent discrete period designated for said transmitter;
   f. indicating an identity segment as a direct function of the total of said summed hits exceeding a predetermined threshold, for each of said discrete periods; and
   g. monitoring the number and relationships of those discrete periods having an identity segment indicated, for decoding said identity information.

2. A method as in claim 1 further comprising the steps of:
   a. registering a plurality of pulses from said transmitter received at different times during the same discrete period;
   b. initiating a timing sequence for each of said registered pulses; and
   c. indicating a hit for each subsequent pulse substantially coincident with said specified time-out for any of said pulses previously registered within said same discrete period.

3. A method as in claim 1 further comprising the steps of:
   a. providing a plurality of specified time-outs for each timing sequence initiated, each time-out having a different duration wherein each of said plurality of time-outs is related to the shortest time-out for that sequence by an integer multiplier; and
   b. indicating a hit for each subsequent pulse substantially coincident with any of said plurality of specified time-outs for each of said registered pulses.

4. A method as in claim 1 further comprising the steps of additionally registering said second received pulse, and initiating a timing sequence therefore.

5. A method as in claim 1 further comprising the steps of:
   a. repeating said method of claim 1 for each transmitter output signal received, in an interleaved and controlled time-multiplexed manner.

6. A time-multiplexer apparatus for decoding identity information contained in a distance measuring equipment transmitter output signal, comprising the following means in a cooperative interconnected structure:
   a. means for designating a plurality of cyclical discrete periods of reception for said transmitter;
   b. means for registering a pulse received from said distance measuring equipment transmitter and during at least one of said plurality of discrete periods of reception for said transmitter;
   c. means for initiating a timing sequence in response to said means for registering, wherein said sequence has a specified time-out;
   d. means for indicating a hit in response to a second received pulse from said transmitter substantially coincident with said specified time-out, and during said at least one discrete period;
   e. means for counting the number of hits obtained during each discrete period, and for summing said number with the number of hits counted in the immediately subsequent discrete period designated for said transmitter;
   f. means for indicating an identity segment as a direct function of the total of said summed hits exceeding a predetermined threshold, for each of said discrete periods; and
   g. means for monitoring the number and relationships of those discrete periods having an identity segment indicated, and for decoding said identity information.

7. An apparatus as in claim 6 further comprising and coupled thereto:
   a. means for registering a plurality of pulses from said transmitter received at different times during the same discrete period;
   b. means for initiating a timing sequence having a specified time-out for each of said registered pulses; and
   c. means for indicating a hit for each subsequent pulse substantially coincident with said specified time-out for any of said pulses previously registered within said same discrete period.

8. An apparatus as in claim 6 further comprising and coupled thereto:
   a. means for providing a plurality of specified time-outs for each timing sequence initiated, each time-out having a different duration wherein each of said plurality of time-outs is related to the shortest time-out for that sequence by an integer multiplier; and
   b. means for indicating a hit for each subsequent pulse substantially coincident with any of said plurality of specified time-outs for each of said registered pulses.

9. An apparatus as in claim 6 further comprising means coupled thereto for additionally registering said second received pulse, and for initiating a timing sequence therefore.

10. An apparatus as in claim 6 further comprising means for decoding identity information from a plurality of transmitter outputs in an interleaved and controlled time-multiplexed manner.

11. An apparatus as in claim 7 further comprising means coupled thereto for decoding identity information from a plurality of transmitter outputs in an interleaved and controlled time-multiplexed manner.

12. An apparatus as in claim 8 further comprising means coupled thereto for decoding identity information from a plurality of transmitter outputs in an interleaved and controlled time-multiplexed manner.

13. An apparatus as in claim 9 further comprising means coupled thereto for decoding identity information from a plurality of transmitter outputs in an interleaved and controlled time-multiplexed manner.

* * * * *